United States Patent [19]

Onuki et al.

[11] Patent Number: 5,497,216

[45] Date of Patent: Mar. 5, 1996

[54] READER-PRINTER

[75] Inventors: Kazuhiko Onuki, Tokyo; Yoshihiro Ishibe, Kawasaki, both of Japan

[73] Assignee: Canon Kabushiki Kaisha, Tokyo, Japan

[21] Appl. No.: 368,233

[22] Filed: Jan. 3, 1995

Related U.S. Application Data

[63] Continuation of Ser. No. 990,917, Dec. 15, 1992, abandoned.

[30] Foreign Application Priority Data

Dec. 24, 1991 [JP] Japan .................................. 3-356393
Dec. 24, 1991 [JP] Japan .................................. 3-356394

[51] Int. Cl.⁶ .................................................. G03B 13/28
[52] U.S. Cl. ............................................ 355/45; 355/66
[58] Field of Search ........................... 355/44, 45, 66; 352/57, 129

[56] References Cited

U.S. PATENT DOCUMENTS

| | | | |
|---|---|---|---|
| Re. 26,771 | 1/1970 | Schwardt et al. | 355/45 |
| 3,512,462 | 5/1970 | Moyroud | 355/45 |
| 4,589,767 | 5/1986 | Yanagi et al. | 355/45 |
| 4,695,155 | 9/1987 | Ishii et al. | 355/45 |
| 4,751,553 | 6/1988 | Fukasawa | 355/45 |
| 4,873,552 | 10/1989 | Otsuki | 355/271 |
| 4,881,099 | 11/1989 | Onuki et al. | 355/45 |
| 4,931,828 | 6/1990 | Fujita et al. | 355/45 |
| 5,028,128 | 7/1991 | Onuki | 353/122 |

*Primary Examiner*—Monroe H. Hayes
*Attorney, Agent, or Firm*—Fitzpatrick, Cella, Harper & Scinto

[57] ABSTRACT

A reader-printer typified by discharging a print sheet from a printer unit towards the front surface of the apparatus. The central line of a projection lens is positioned on one side of the apparatus as viewed from the front surface of the apparatus with respect to the central line of a projection screen of a reader unit. The central line of a print discharging section in the print sheet discharging/conveying direction is positioned on the other side thereof.

18 Claims, 21 Drawing Sheets

READER-PRINTER

This application is a continuation of application Ser. No. 07/990,917, filed Dec. 15, 1992, now abandoned.

BACKGROUND OF THE INVENTION

1. Field of the Invention

The present invention relates to a reader-printer of a microfilm.

2. Related Background Art

In a reader printer, it is preferably in terms of operation that a print sheet (copying material for a desired image frame of microfilm) outputted from a printer unit (copying unit) is discharged towards the front surface of a reader printer body (hereinafter referred to as an apparatus) to which the operator faces. The thus constructed apparatuses are already known (U.S. Pat. Nos. 4,695,155, 4,931,828 and 4,873,552).

FIG. 28 is a front elevation showing one example of the apparatus.

A lower box unit, generally designated by 1, of the apparatus incorporates mainly a printer mechanism (unillustrated), a film illuminating section (illumination optical system) 4 and a print discharging section 5. A port 5a formed in the surface of a front plate 1a of the lower box unit serves to take out the print sheet discharged from the print discharging section 5.

An upper box unit 2 of the apparatus that serves as a reader unit dark box. A transmission type projection screen 8 is disposed on the front surface of the upper box unit.

A recessed air space section generally indicated by 3 has its open front part and serves as a film setting section provided between the lower box unit 1 and the upper bow unit 2.

A microfiche carrier 6 is mounted on an upper plate 1b of the lower box unit in the recessed air space section 3. This carrier is constructed of a frame body freely slidable, as shown in FIG. 29, back and forth or right and left on the upper plate 1b of the lower box unit; and two pieces of upper and lower film-insert glass plates 6a, 6b supported on this frame. A microfiche film F is inserted between the upper and lower glass plates 6a, 6b and set therein.

A stationary projection lens designated by 7 is disposed upwardly of the film carrier 6 in the recessed air space section 3. The carrier 6 is moved horizontally under this projection lens 7.

The carrier 6 is moved while grasping a handle 6c of the carrier 6. Then, the desired image frame on the surface of the microfiche film F inserted between the glass plates 6a, 6b is retrieved and positioned under the projection lens 7. Thereupon, image information of the retrieved image frame is projected in enlargement on the inner surface of the transmission type screen 8 through the film illuminating section 4 within the lower box unit 1, the projection lens 7 and a reader optical system consisting of some unillustrated reflection members (mirrors) within the apparatus. The projected enlarged image can be read on the outer plane of the screen 8.

Further, when obtaining a print of the image information of the image frame, an unillustrated print key is depressed, thereby actuating the printer mechanism. The image information of the image frame is projected and exposed in an image forming section of the printer mechanism through the film illuminating section 4, the projection lens 7 and the printer optical system consisting of some unillustrated reflection members. Printing is thus executed. Then, an enlarged print sheet P of the image information of the image frame is discharged to the print discharging section 5 of the lower box unit 1. The print sheet P can be taken out of a take-out port of the front plate 1a of the lower box unit 1.

(A): In the apparatus described above, as obvious from FIG. 28, three lines—(1) a central line SC of the screen 8 in the crosswise direction, (2) a central line FC of the projection lens 7, and (3) a central line PC of the print discharging section 5 in a print discharging/conveying direction—are coincident with each other as viewed from the front face of the apparatus.

The following drawbacks are peculiar to the thus constructed apparatus.

Concretely, when the carrier 6 is pulled and moved on this side, the handle 6c thereof is protruded outside from a front edge of the upper plate 1b of the lower box unit 1 of the apparatus. A protruded quantity thereof increases with a larger pull-in moving quantity of the carrier 6. If the image frame on the inner side of the film F is retrieved to the position of the projection lens 7, the carrier handle 6c is largely protruded as shown in FIG. 29. The largely protruded carrier handle 6c overshadows the print sheet take-out port 5a of the print discharging section 5 which is formed in the front plate 1a of the lower box unit 1 under the carrier 6.

It is therefore impossible to immediately confirm conditions (print range, image density, etc.) of the image on the print sheet P discharged to the print discharging section 5. This confirmation involves a step of visually observing a face portion of the top edge of the print sheet that is exposed outside from the print sheet take-out port 5a and a face portion of the print sheet in a visible range within the print discharging section 5. Besides, it is hard to take out the print sheet P discharged to the print discharging section 5 due to an obstacle of the largely protruded carrier handle 6c.

(B) The print discharging section 5 exhibits such a relation that the print discharging section 5 is located under the film illuminating section 4 in the lower box unit 1 of the apparatus. Hence, a height dimension H of the lower box unit 1 is large, and a size of the entire apparatus in the heightwise direction increases, correspondingly. The symbol W represents a width dimension of the apparatus.

Further, the print sheet take-out port 5a of the print discharging section 5 is located considerably below the upper plate 1b of the lower box unit 1. Hence, there declines the facility to confirm the conditions of the image on the discharged print sheet P and take out the print sheet P.

(C) The print discharging section 5 is, as illustrated in FIG. 30, disposed so that the central line PC in the print discharging/conveying direction thereof deviates rightwards (or leftwards) largely from the central line FC of the projection lens 7 as viewed from the front surface of the apparatus. With this arrangement of the apparatus, the positional relation is so set that the print sheet take-out port 5a is not substantially overshadowed by the protruded portion of the carrier handle 6c pulled and moved on this side. The problem stated in the item (A) can be thereby obviated.

In this case, however, the arrangement is such that the printer unit deviates crosswise in position largely from the reader unit (upper box unit 2) including the screen 8. Therefore, at least a width dimension W1 of the lower box unit 1 is greater than the width dimension W of the apparatus shown in FIG. 28, with the result that the apparatus increases in size.

SUMMARY OF THE INVENTION

It is a primary object of the present invention, which obviates the drawbacks and problems stated in the foregoing items (A)–(C), to provide a reader-printer typified by discharging the print sheet in front of the apparatus.

According to one aspect of the present invention, there is provided a reader-printer typified by discharging a print sheet from a printer unit towards the front surface of the apparatus. The central line of a projection lens is positioned on either the right or left side of the apparatus as viewed from the front surface of the apparatus, wherein the central line of a projection screen of a reader unit in the crosswise direction is aligned with the middle of the apparatus. The central line of a print discharging section in the print sheet discharging/conveying direction is positioned on the other side thereof.

In the connection with the projection lens and the print discharging section, the central line of the projection lens is positioned on one side of the right and left sides of the apparatus as viewed from the front surface of the apparatus, wherein the central line of the projection screen of the reader unit in the crosswise direction is aligned with the middle of the apparatus. The central line of the print discharging section in the print sheet discharging/conveying direction is positioned on the other side thereof. With this placement, a film carrier and the print discharging section can be disposed with large deviations to the right and left sides of the apparatus with respect to the projection lens. This is done within a range of normal width dimensions of the apparatus, i.e., without increasing the side of the apparatus by enlarging the width dimension of the apparatus.

Hence, even when largely pulling and moving the carrier, the print sheet take-out port is not substantially overshadowed by the carrier largely protruding outward on this side of the apparatus. The protruded carrier does not hinder a confirmation by visually observing the conditions of an image on the print sheet discharged to the discharging section and the take-out thereof.

The film illuminating section and the print discharging section with respect to the projection lens can be also arranged substantially at the same level on the right and left sides on the front surface of the apparatus. With this arrangement, it is possible to make the size of the whole apparatus in the heightwise direction smaller than in such an arrangement that the film illuminating section and the print discharging section are disposed up and down. Further, it is feasible to simplify the confirmation of the conditions of the image on the discharged print sheet at the print sheet take-out port of the print discharging section and the take-out thereof.

Besides, the apparatus opening/closing door is provided in a portion on the side of the front surface of the apparatus, corresponding to the location of the printer unit in the apparatus. The apparatus front-surface-sided portion deviates from the film carrier as well as from the projection lens. It is therefore possible to easily conduct a jam treatment by making open the printer unit of the apparatus while opening the door and exchanging a cleaning pad of a fixing device from the front surface of the apparatus without being hindered by the projection lens and the film carrier.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

An embodiment 1 of the present invention will hereinafter be described with reference to FIGS. 1 through 11.

Figure 28:
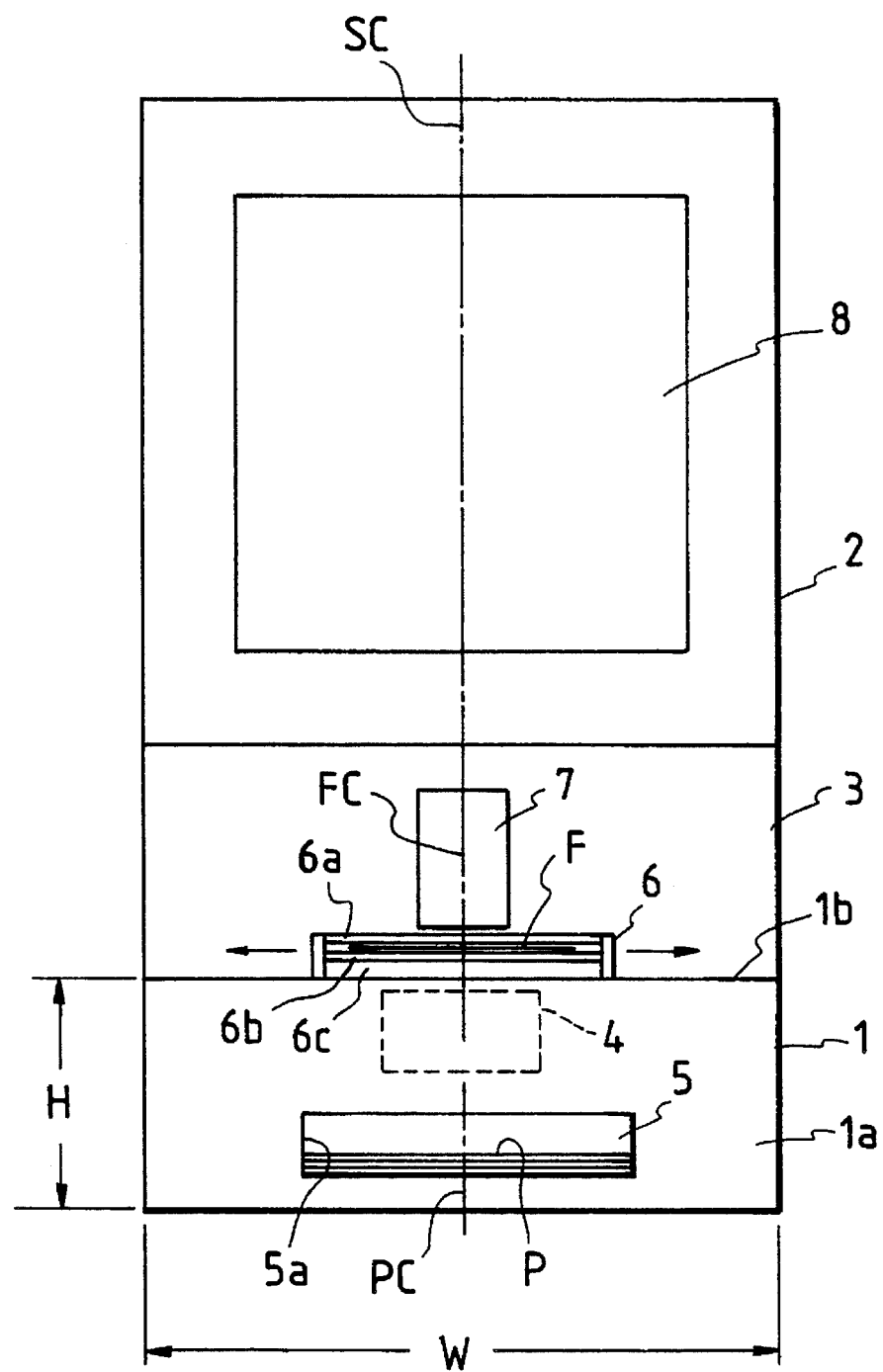
FIG. 28 is a front view showing a conventional apparatus.
Figure 29:
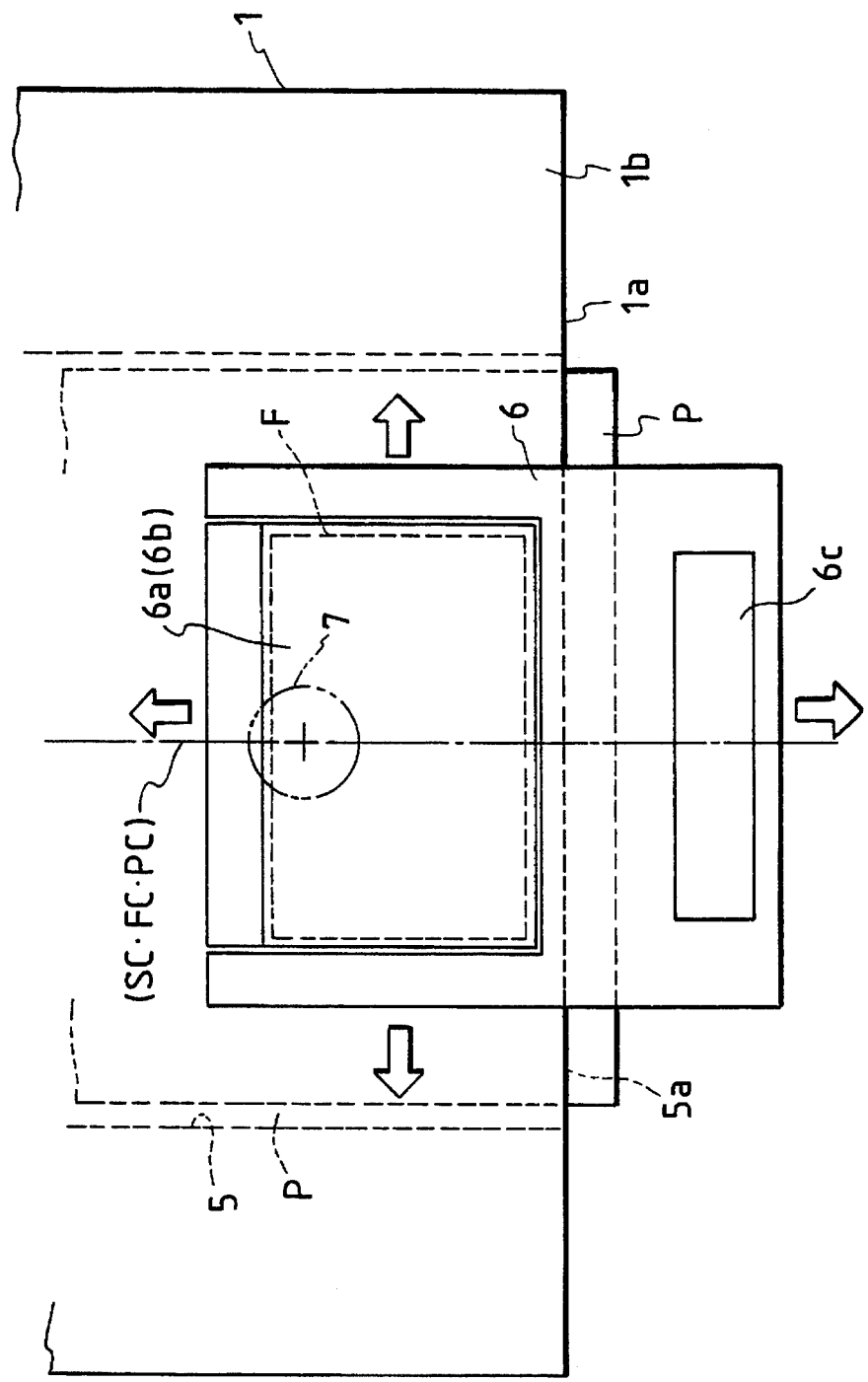
FIG. 29 is an enlarged plan view illustrating a film carrier.
Figure 30:
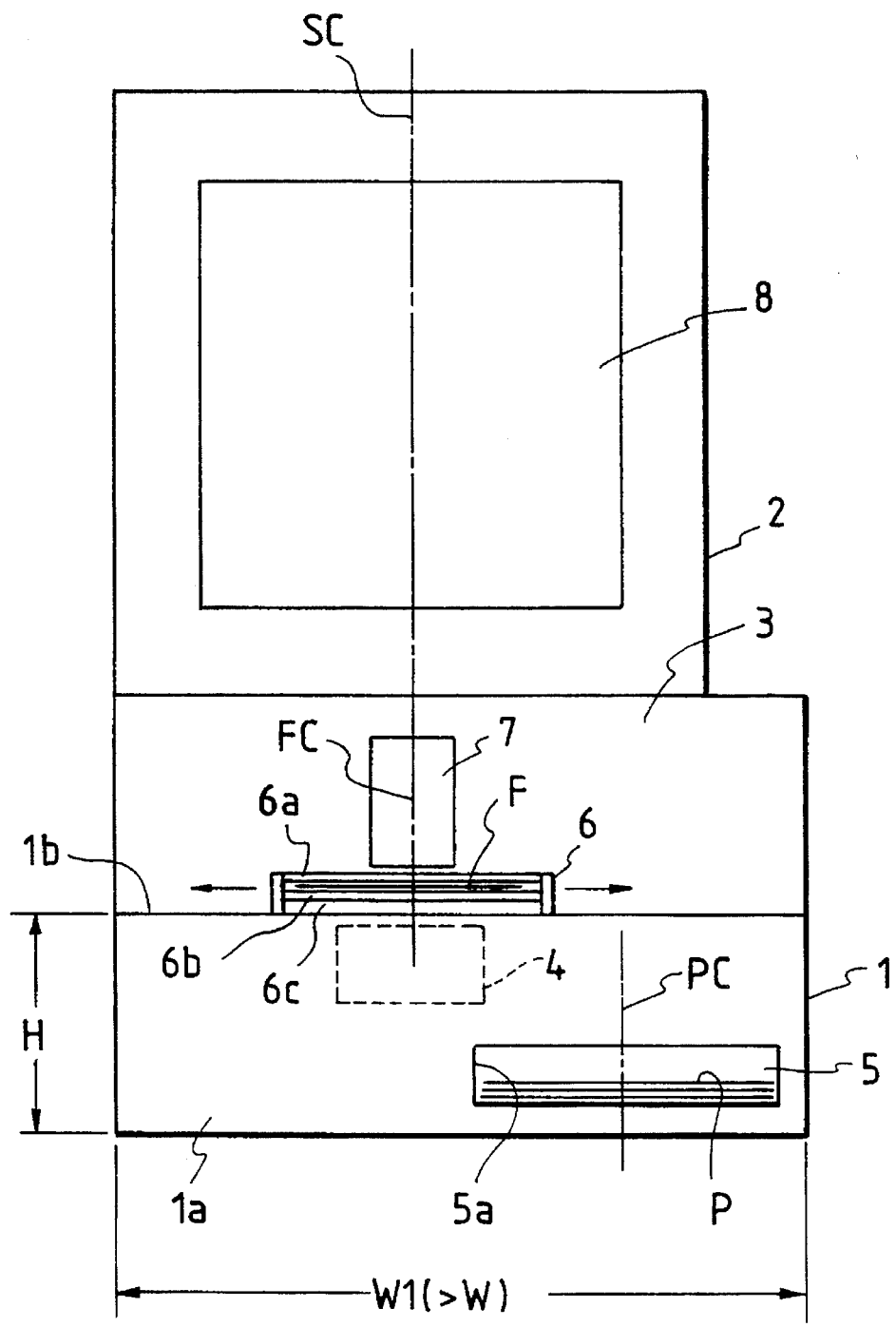
FIG. 30 is a front view showing the apparatus in which the apparatus has an increased dimention of width.

The same constructive members and parts common to those of the apparatus shown in FIGS. 28 through 30 are marked with like symbols, and therefore a repetitive description will be omitted.

A correlation between central lines SC, FC and PC will be explained.

Figure 1:
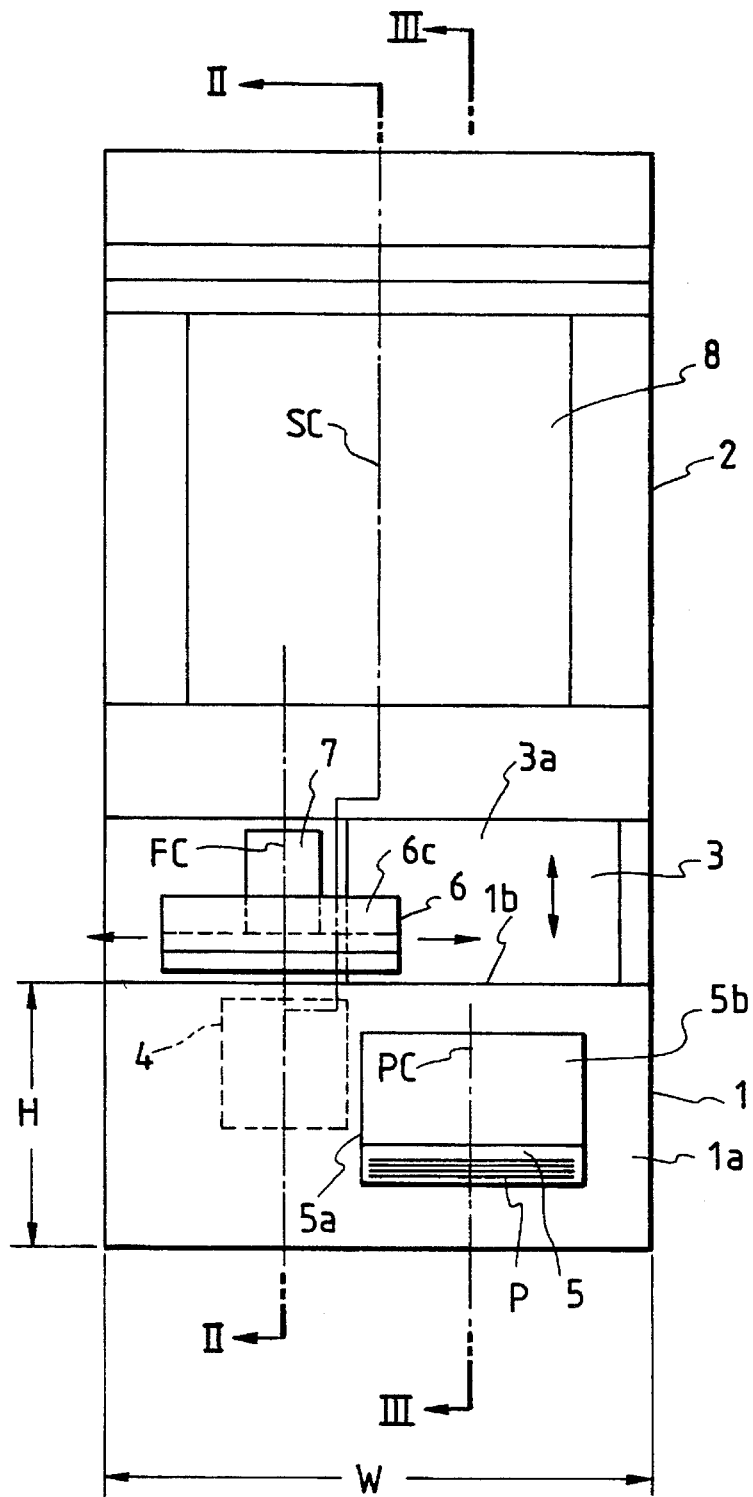
FIG. 1 is a front view illustrating an apparatus (reader-printer) in a first embodiment.
Figure 2:
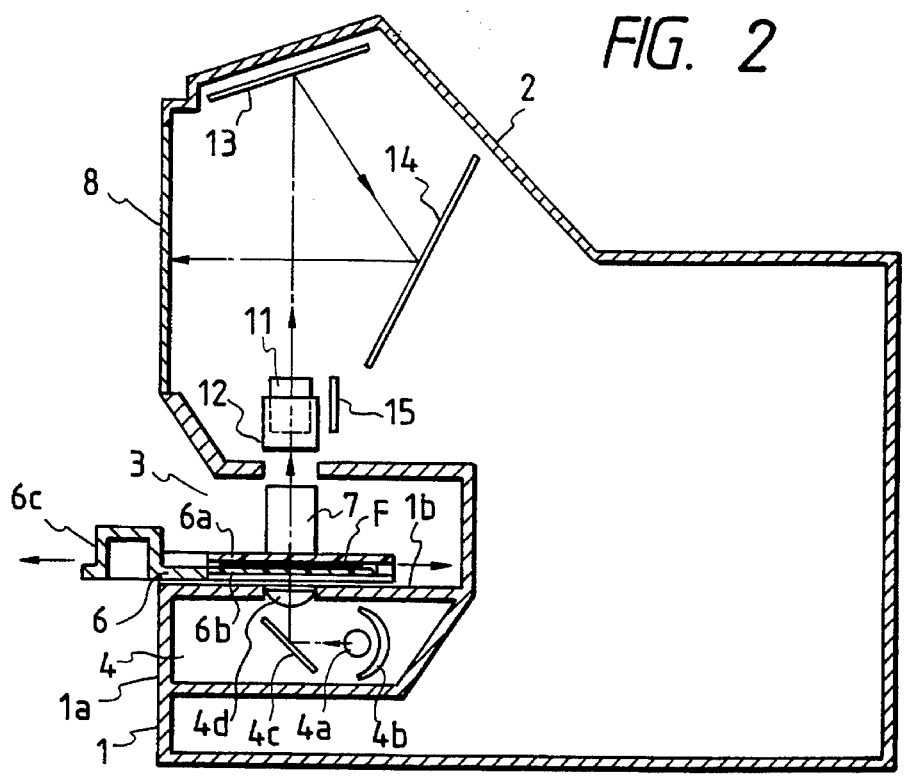
FIG. 2 is a vertical sectional side view taken substantially along the line II—II in FIG. 1.
Figure 3:
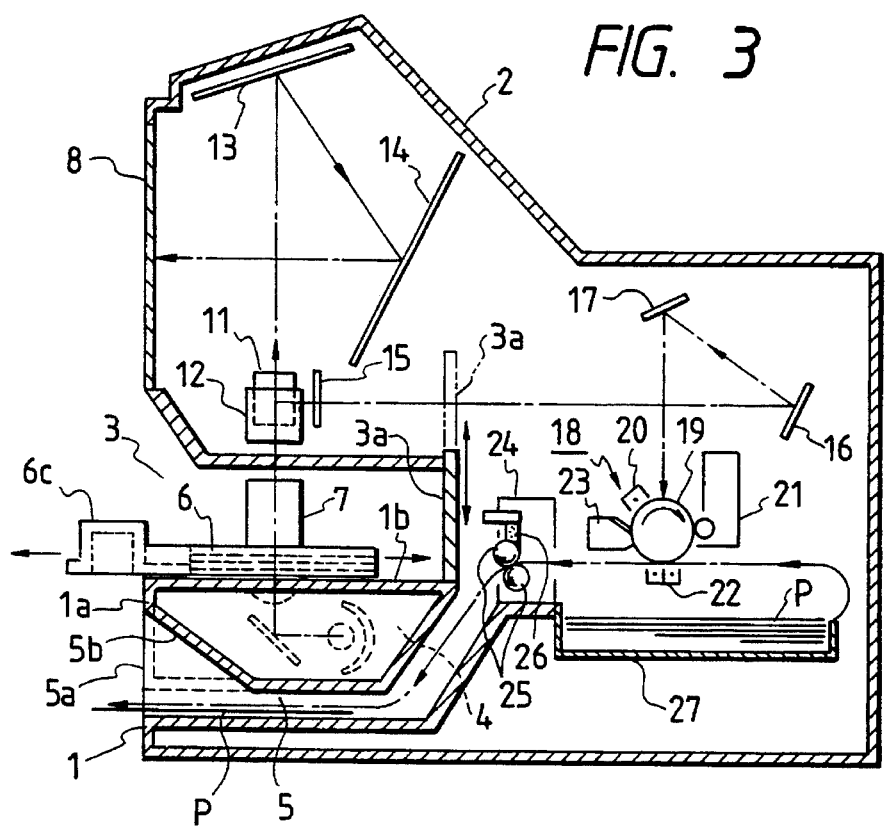
FIG. 3 is a vertical sectional side view taken substantially along the line III—III in FIG. 1.

FIG. 1 is a front view illustrating a reader-printer according to the present invention. FIG. 2 is a vertical sectional side view taken substantially along the line II—II in FIG. 1. FIG. 3 is a vertical sectional side view taken substantially along the line III—III in FIG. 1.

In the apparatus in this embodiment, the central line SC of a screen 8 in the crosswise direction is identical with a central line of the apparatus in the crosswise direction. A projection lens 7 is disposed so that the central line FC thereof deviates leftwards from the central line SC as viewed from the front surface of the apparatus. A print discharging section 5 is disposed so that the central line PC thereof in a print sheet discharging/conveying direction deviates to the opposite side, i.e., the right side.

With this arrangement, it is possible to establish a relation between a film carrier 6 and the print discharging section 5, wherein they are disposed with large positional deviations to the right and left sides on the front surface of the apparatus. This is done within a range of a normal width dimension W of the apparatus, i.e., without an increase in size of the apparatus by enlarging the width dimension of the apparatus.

In the apparatus in this embodiment, the film carrier 6 is located substantially in a left half of an upper plate 1b of a lower box unit 1 of the apparatus and then moved. The print discharging section 5 is located substantially in a right half of the lower box unit 1 of the apparatus. A print sheet take-out port 5a thereof is located substantially in a right half of a front plate 1a of the lower box unit. The take-out port 5a is formed with a rightward deviation largely from the film carrier 6 described above.

Hence, even when moving the carrier 6 by greatly pulling it, the print sheet take-out port 5a is not substantially overshadowed by a carrier handle 6c largely protruding outwards on this side of the apparatus. The protruded carrier 6 does not hinder a confirmation of conditions of an image on print sheet P (transfer sheet) discharged to a discharging section 5 through a visual observation and the take-out thereof.

Made easier are the confirmation of the conditions of the image on the discharged print sheet P through the visual observation and the take-out thereof. For this purpose, as illustrated in a vertical sectional side view of FIG. 3, the apparatus in this embodiment is constructed so that a ceiling face close to the print sheet take-out port 5a of the print discharging section 5 is formed as an inclined surface 5b skewed upwards in the outer direction, and the take-out port 5b is formed wide enough to permit an easy visual observation into the inner portion of the print discharging section 5.

The projection lens 7 and the film carrier 6 exist substantially in a left half of a recessed air space section 3 serving as a film setting section. Other members and parts do not exist in a right half thereof. This air space section is relatively large enough to allow an insertion of a hand into the inner portion without being hindered by the projection lens 7 and the film carrier 6.

In the apparatus in accordance with this embodiment, an apparatus wall plate 3a on the inner side of this air space section is formed as a slide door. The door is, as illustrated in FIG. 3, opened and closed in the up-and-down directions.

When conducting a jam treatment in a fixing device 24 of a printer mechanism 18 (FIG. 3) in the apparatus which will be mentioned later and exchanging a fixing device cleaning pad 26, the hand is inserted into a subsection of the substantially right half of the recessed air space section 3 to slide upwards the opening/closing door 3a disposed on the inner side thereof. The interior of the apparatus is thus opened. The above-mentioned jam treatment and the exchange of the cleaning pad can be easily performed from the front surface of the apparatus with no hindrance by the projection lens 7 and the film carrier 6.

The door 3a is equipped with, though not illustrated, an opening/closing knob and a stopper member or the like for holding an open state. The door 3a may be of a bilateral slide opening/closing type or a pivotable opening/closing type on a hinge.

Figure 4:
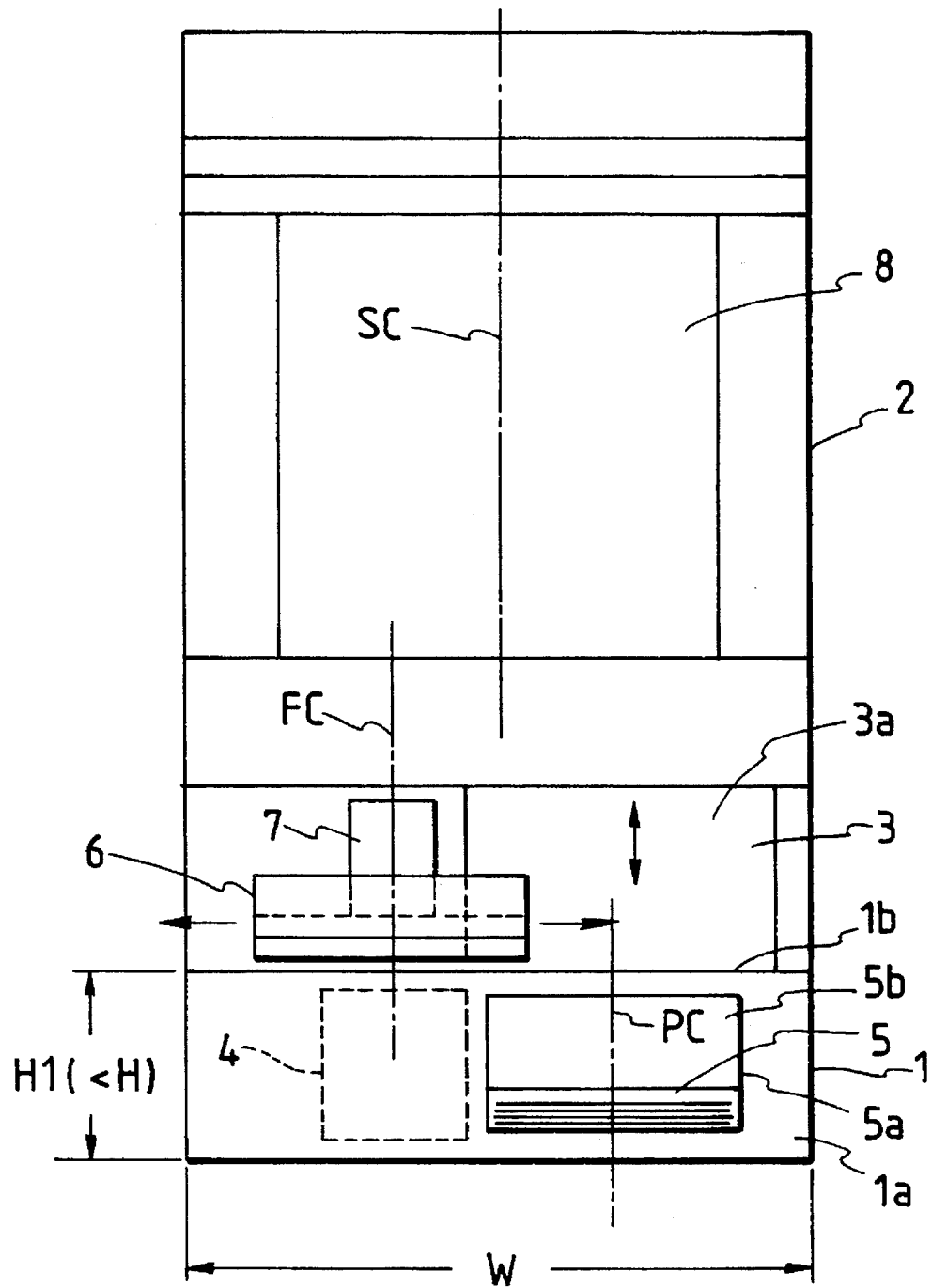
FIG. 4 is a front view showing the apparatus in which a height dimension of a lower box unit is reduced.
Figure 5:
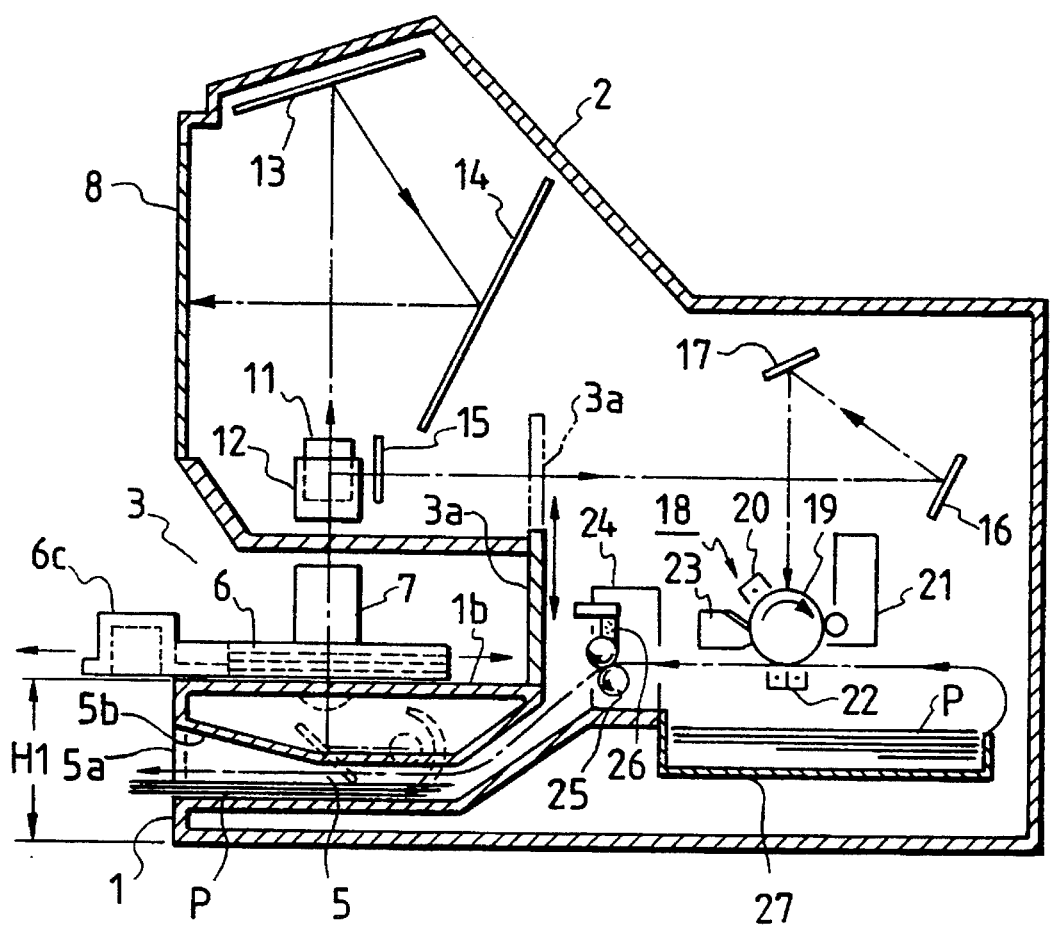
FIG. 5 is a vertical sectional side view taken substantially along the line IV—IV in FIG. 4.

The film illuminating section 4 and the print discharging section 5 may be, as shown in FIGS. 4 and 5, arranged on left and right sides of the apparatus in the lower box unit 1 of the apparatus. In this case, a height dimension H1 of the lower box unit 1 can be set smaller than a height dimension H of the apparatus shown in FIGS. 1 through 3. A size of the entire apparatus in the heightwise direction can be reduced.

Further, the print sheet take-out port 5a of the print sheet discharging section 5 is not located excessively below the surface of the upper plate 1b of the lower box unit 1, thereby simplifying the confirmation of the conditions of the image on the discharged print sheet P and the take-out thereof.

The following is an explanation of an optical system.

Figure 6:
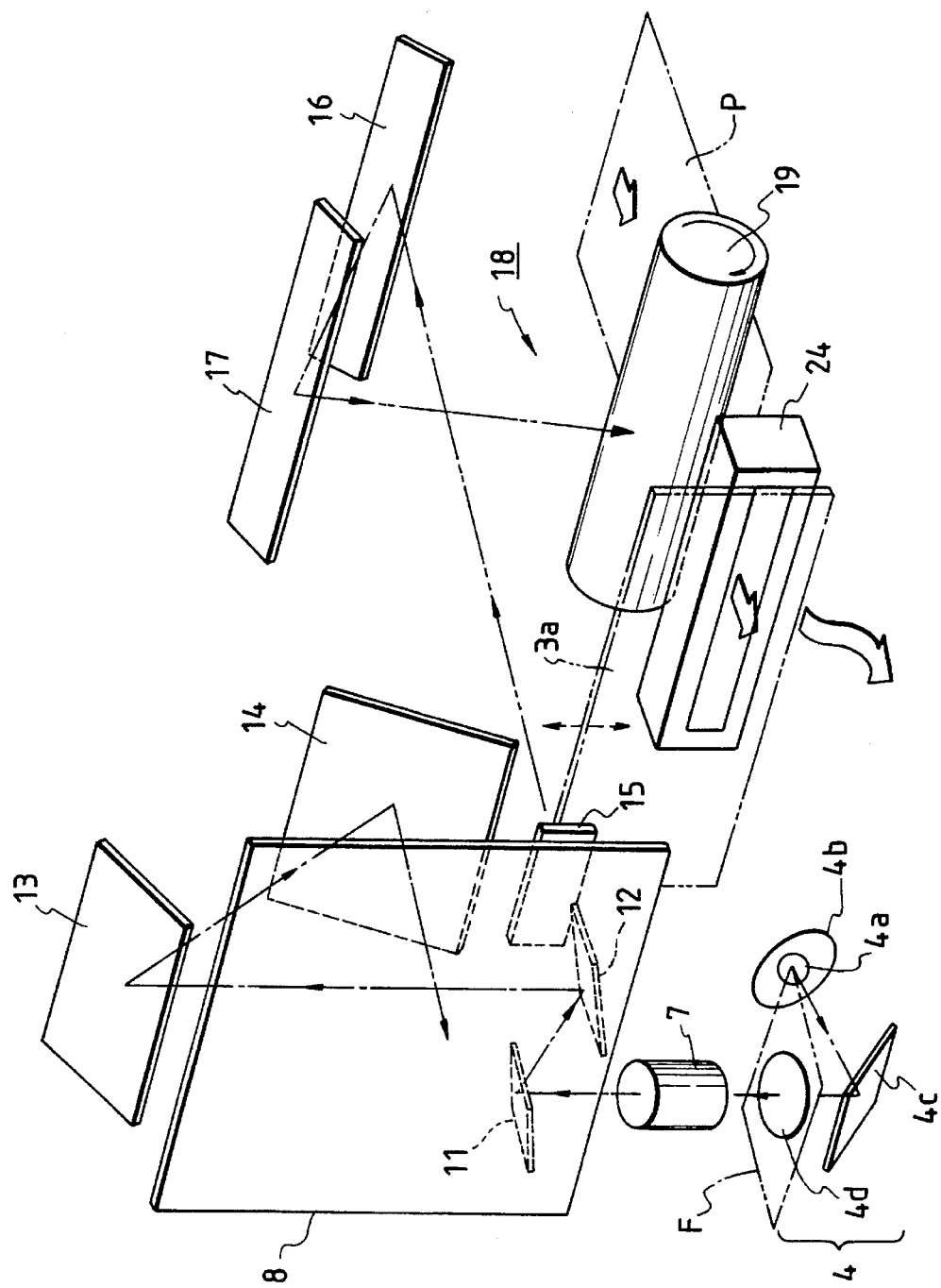
FIG. 6 is a perspective view of an optical system.
Figure 7:
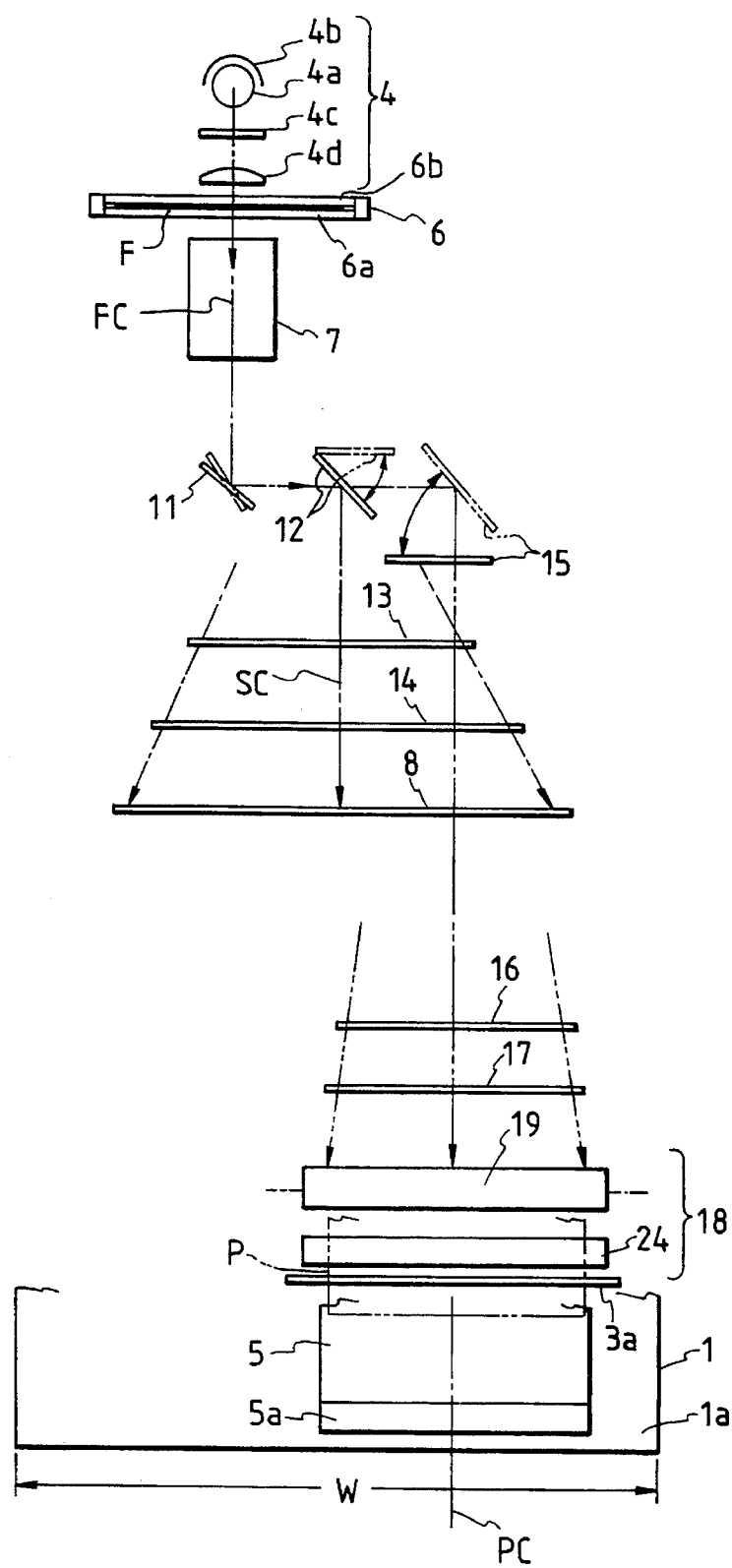
FIG. 7 is a development elevation of the optical system.

FIG. 2 is a side view illustrating a reader optical system. FIG. 3 is a side view illustrating two optical systems of a reader and a printer. FIG. 6 is a perspective view of the two optical systems. FIG. 7 is a development elevation of the two optical systems.

A reader optical system will be hereinbelow described.

The film illuminating section 4 is, as illustrated in FIG. 2, disposed under the upper plate of the lower box unit 1 of the apparatus. The film illuminating section 4 is constructed of an illumination lamp 4a, a reflection shade 4b, a reflection member(hereinafter referred to as a mirror) 4c and a condenser lens 4d. Illuminated from under is a film image frame which has been retrieved and positioned under the projection lens 7 by the film carrier 6.

In a reader mode, a reader optical path is formed through mirrors 11–14. A ray of image frame transmitted light of the illumination light passes through the projection lens 7 and enters the upper box unit 2. The image frame transmitted light is turned and reflected in this sequence: the first mirror 11→the second mirror 12→the third mirror 13→the fourth mirror 14. The transmitted light is projected to form an enlarged image on the inner surface of the projection screen 8. The projected image is read on the outer plane of the screen 8.

Figure 8:
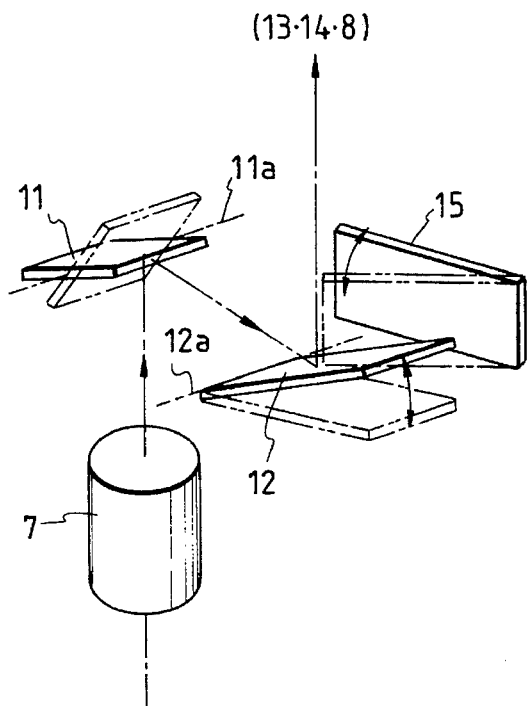
FIG. 8 is a view showing states of a first, second and fifth mirrors during a reader mode.
Figure 10:
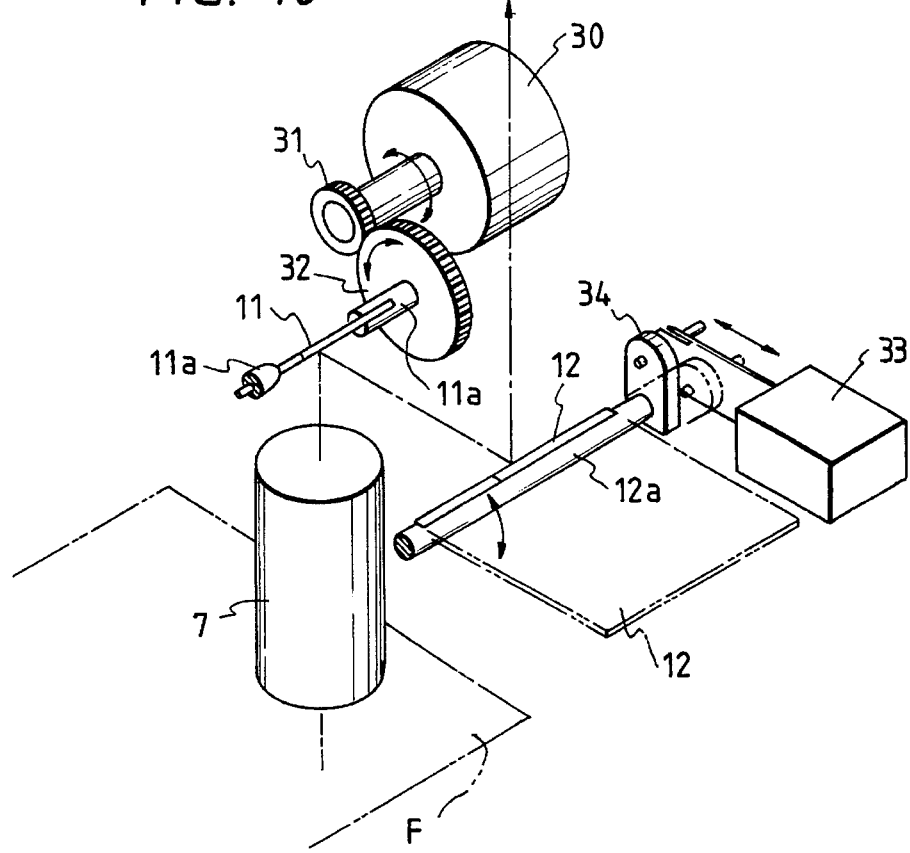
FIG. 10 is a perspective view illustrating a means for driving the first and second mirrors.

The first mirror 11 is a rotary scan mirror rotated forwards and reversely about a horizontal shaft 11a (FIGS. 10 and 11) in the back-and-forth directions of the apparatus by means of a forward-reverse rotation motor 30 and gears 31, 32. During the reader mode, the reflection surface is fixedly held in a first angular posture position (reader position) so that the surface is skewed rightwards downwards (FIGS. 6, 8 and 10). The light outgoing upwards from the projection lens 7 and incident upwards from under upon the upper box unit 2 is turned rightwards of the apparatus by the first mirror 11 in the first angular posture position.

The second mirror 12 is held in the first angular posture position (reader position) (FIGS. 6, 8 and 10) in which the reflection surface is skewed leftwards upwards on the basis of the horizontal shaft 12a (FIGS. 10 and 11) in the back-and-forth directions of the apparatus. The second mirror 12 is also held in the second angular posture position (retreat position) in which the reflection surface is fallen substantially horizontally (as indicated by two-dotted chain lines in FIGS. 8, 10 and shown in FIG. 9). These positions are controlled by switching ON/OFF a first electromagnetic solenoid-plunger device (herein abbreviated to SL device) 33. During the reader mode, the second mirror 12 is held in the first angular posture position with the reflection surface being skewed leftwards upwards. The reflected light from the first mirror 11 is thereby turned upwards.

The first angular posture position of the second mirror 12 is set in a relation where the optical axis of an upward reflective optical path by the second mirror 12 coincides substantially with the central line SC of the screen 8 in the crosswise direction.

The light turned upwards by the second mirror 12 is then reflected sequentially by the third and fourth mirrors 13, 14. The reflected light is projected to form an image on the plane of the screen 8.

A printer optical system will next be described.

When depressing a print key, a driving sequence of the printer mechanism 18 of the apparatus is started. The printer mechanism 19 of the apparatus in this embodiment is a known transfer type electrophotographic copying mechanism. Referring to FIG. 3, the numeral 19 represents a rotary drum type electrophotographic photosensitive body; 20 an electrifier; 21 a developing device; 22 a transfer electrifier; 23 a cleaning device; 24 an image fixing device; 25 a fixing roller of the fixing device; 26 a cleaning pad for the fixing device; 27 a sheet feed cassette; and P a transfer sheet accommodated in the cassette.

Figure 9:
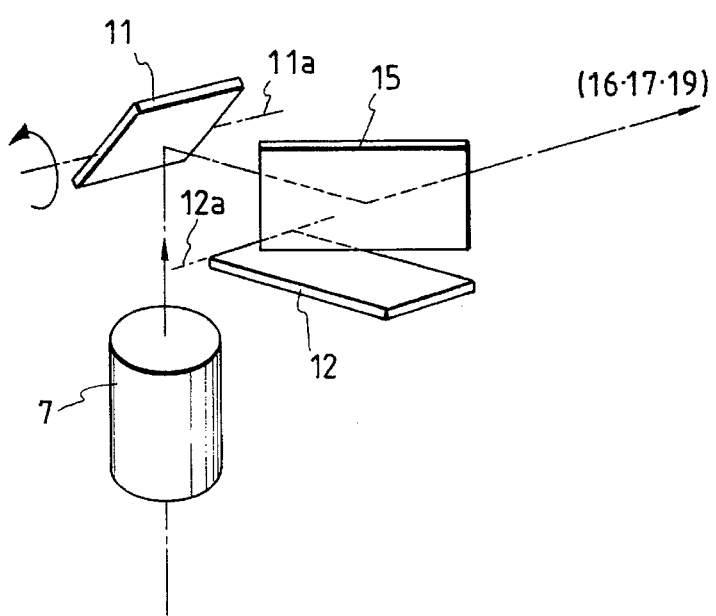
FIG. 9 is a view showing states of the same during a printer mode.
Figure 11:
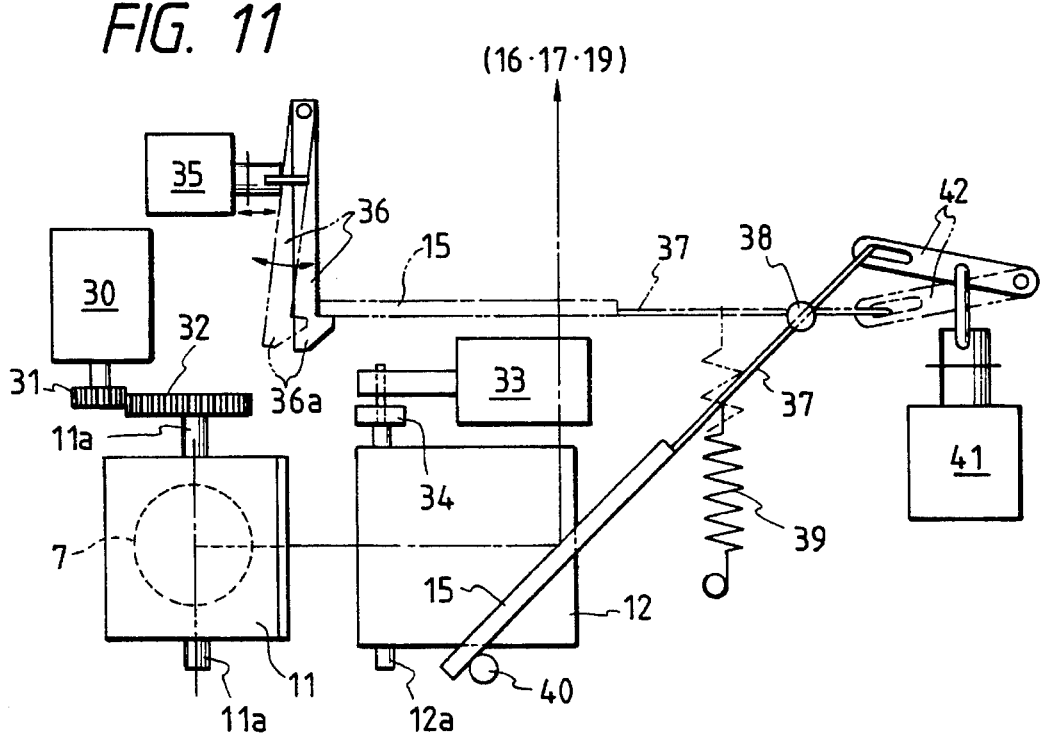
FIG. 11 is a plan view illustrating a means for driving the first, second and fifth mirrors.

The second mirror 12 is switched to the second angular posture position with the reflection surface being fallen substantially horizontally (FIGS. 9 and 11).

Further, referring to FIG. 11, a second SL device 35 is energized with electricity for a short time. An engaging lever 36 of a fifth mirror 15 is thereby swung to a release posture position indicated by a two-dotted chain line from an engaging posture position shown by a solid line. A hook 36a gets free of an edge of the mirror, thus disengaging the fifth mirror 15. The fifth mirror 15 is rotated from the first angular posture position in which it is held in the retreat position shown by the two-dotted chain line due to this disengagement. The mirror 15 is rotated counterclockwise in FIG. 11 on a hinge shaft 38 of a mirror support member 37 by a force of a tensile spring 39. This rotation continues untill the mirror 15 is received by a stopper pin 40 upon an impingement thereon. The mirror 15 is thus switched to the second angular posture position where the reflected surface is skewed leftwards backwards substantially at 45 degrees. A print optical path is thereby formed, and the operation is changed to the print mode.

Subsequently, the motor 30 of the first mirror 11 is energized with electricity to make a forward-rotation. The first mirror 11 is temporarily rotated about the horizontal shaft 11a in FIG. 11 at a predetermined angular speed in the counterclockwise direction as viewed on the front surface of the apparatus. After the mirror 11 has been rotated through a predetermined rotational angle, the motor is energized with electricity to make a reverse-rotation. The first mirror 11 is thereby rotated clockwise about the horizontal shaft 11a. With this rotation of the first mirror 11, an optical scan of the light outgoing from the projection lens 7 is effected. Then, the reflected light from the rotated first mirror 11 is incident on the fifth mirror 15 switched to the second angular posture position. The incident light is turned backwards in the back-and-forth directions of the apparatus.

The first mirror 11 is rotated while being considerably decelerated due to a gear ratio of the gear 31 versus the gear 32. A scanning speed and direction of the light outgoing from the projection lens 7 through the rotated first mirror 11 coincide with a rotating speed and direction of a photosensitive drum 19 of the printer mechanism 18.

A second position of the fifth mirror is set in a relation where the optical axis of a backward-turn optical path by the fifth mirror substantially coincides with the central line PC of the print discharging section 5 in the print sheet conveying direction.

The light turned backwards by the fifth mirror 15 is reflected sequentially by sixth and seventh mirrors 16, 17. The reflected light is projected to form an image on the surface of the rotary photosensitive drum 19 of the printer mechanism 18. More specifically, an enlarged image of information of an image frame of a film F undergoes a slit exposure on the surface of the rotary photosensitive drum 19. Printing of the exposed image information is executed by the printer mechanism 18. The print sheet P passing through an image transfer section of the photosensitive drum 19 is discharged to the print discharging section 5 via the fixing device 24.

The first mirror 11 is, when rotated up to a predetermined rotation end point, rotationally returned by energizing the motor 30 with electricity to make the reverse-rotation. In the case of copying a plurality of sheets, the first mirror 11 is rotated forwards and rotationally returned with repetitions corresponding to a set number of sheets to be copied.

When switched from the printer mode again to the reader mode, the first mirror 11 is fixedly held in the first angular posture position (reader position).

Further, a third SL device 41 (FIG. 11) is energized with electricity for a short time. The mirror support member 37 is then rotated clockwise in FIG. 11 on the hinge shaft 38 by the swing lever 42 while resisting the tensile spring 39. The fifth mirror 15 is thereby rotationally returned to the first angular posture position, i.e., the retreat position indicated by the two-dotted chain line. The edge of the mirror 15 engages with the hook 36a of the engaging lever 36, whereby the mirror 15 is held in the first angular posture position.

Next, the second mirror 12 is returned and switched to the first angular posture position with the reflection surface being skewed leftwards upwards from the second angular posture position with the reflection surface being substantially horizontally fallen.

The optical system thereby reverts to a state of the reader mode.

Switching of the second mirror 12 to the first angular posture position (reader position) and the second angular posture position (retreat position) may involve the following arrangements. During the reader mode, the second mirror 12 is always rotationally biased to the first angular position, and this position is held by the stopper. During the printer mode, the second mirror 12 is rotationally fallen and held in the second angular posture position while resisting the biasing spring member by a rotational moving force of the fifth mirror 15 in contact With the mirror 15 rotationally switched to the second angular posture position. The fifth mirror 15 is again rotationally returned to the first angular posture position defined as the retreat position. At this time, the second mirror 12 interlocks therewith and again returns to the first angular posture position by the biasing force of the spring member due to the escape of the mirror 15.

Referring to FIG. 6, as explained earlier, the slide door 3a opened and closed in the up-and-down directions is provided on the apparatus wall plate on the inner part of the subsection of the substantially right half of the recessed air space section 3 serving as the film setting section. The hand is inserted into the subsection of the substantially right half of the recessed air space section 3 to open the door 3a upwards. The fixing device 19 of the printer mechanism 18 of the apparatus is thereby brought into an open state. It is possible to easily perform the jam treatment in the fixing device and exchange the cleaning pad 26 on the front surface of the apparatus without being hindered by the projection lens 7 and the film carrier 6.

Figure 12:
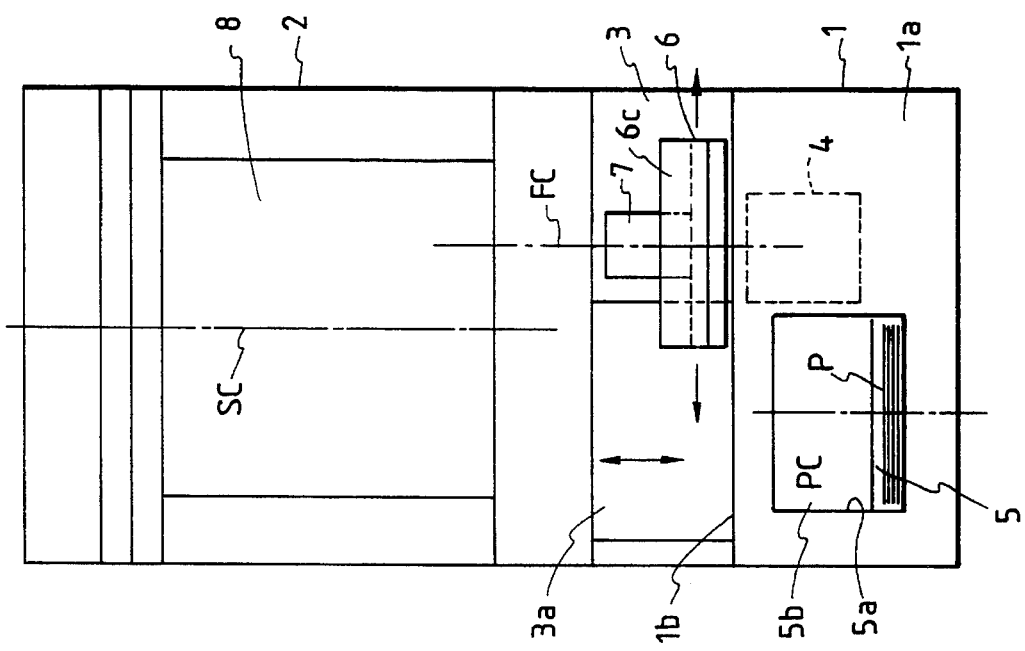
FIG. 12 is a front view showing an apparatus in a second embodiment.

An embodiment 2 of the present invention will hereinafter be described with reference to FIG. 12.

In accordance with this embodiment, reversely to the apparatus in the embodiment 1 discussed above, the central lines SC, FC and PC are located with the projection lens 7 deviating rightwards of the central line FC. In this location, the central line SC of the screen in the crosswise direction is again in the middle of the apparatus as viewed from the front surface of the apparatus. The print discharging section 5 is disposed with a leftward deviation of the central line PC in the print sheet discharging/conveying direction.

An advantage peculiar to the apparatus in this embodiment is that manipulating portions of the projection lens 7 and the film carrier 6 exhibiting a high frequency in terms of manipulation are disposed on the right side of the apparatus. An easy manipulation by a skill hand, i.e., the right hand, is consequently provided.

Note that placement of the members in the apparatus exhibits a complete symmetry with respect to the apparatus in the embodiment 1.

Figure 13:
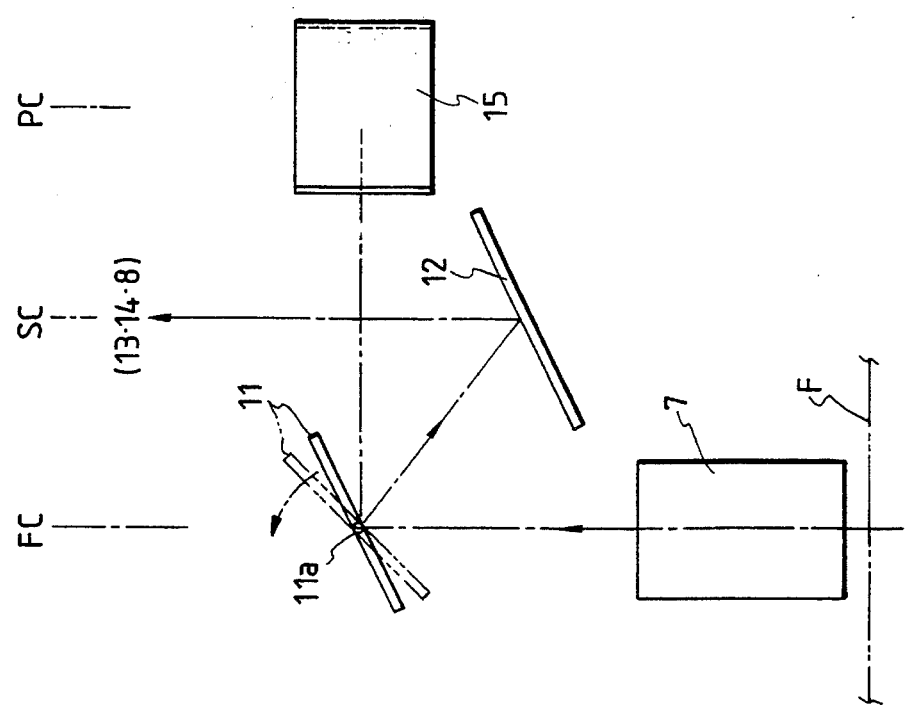
FIG. 13 is a front view illustrating the first, second and fifth mirrors of an apparatus in a third embodiment.

An embodiment 3 of the present invention will hereinafter be explained with reference to FIG. 13.

This embodiment presents another constructive example of the reader optical system and the printer optical system.

In accordance with this embodiment, the second mirror 12 and the fifth mirror 15 are each fixedly disposed beforehand in the first angular posture position defined as a reader position and in the second angular posture position defined as a printer position. The second mirror 12 is disposed below the fifth mirror 15. These mirrors are retreated from the reader optical path and the printer optical path. As in the case of the apparatus in the embodiment 1, the first mirror 11 is a rotary scan mirror.

During the reader mode, the first mirror 11 is fixedly held in the first angular posture position indicated by the solid line to have an angle to reflect the light outgoing from the projection lens 7 towards the second mirror 12. The light reflected upwards by the second mirror 12 is projected to form an image on the plane of the screen 8 via the third and fourth mirrors 13, 14.

Since the fifth mirror 15 is located with a retreat from the reader optical path, the light is not incident on the fifth mirror 15 from the first mirror 11.

During the printer mode, the first mirror 11 is rotationally switched to the second angular posture position indicated by the two-dotted line to have an angle to reflect the light outgoing from the projection lens 7 towards the fifth mirror 15. Subsequently, a scanning rotation is conducted at a predetermined angular speed. The scanning light thereof enters the printer mechanism 18 via the fifth, sixth and seventh mirrors 15, 16, 17. Printing is then executed.

In this instance, the fifth mirror 15 is switched to the second angular posture position, with the result that the scanning light of the rotated first mirror 11 is not incident on the second mirror 12.

The apparatus in this embodiment has no necessity to drive the second and the fifth mirror 12, 15 while switching their postures as in the embodiment 1 in the mutual switching during the reader and printer modes. It is therefore possible to reduce the costs because the driving means is unnecessary.

An embodiment of the present invention will hereinafter be explained referring to FIGS. 14 and 15.

This embodiment presents still another constructive example of the reader and printer optical systems.

Figure 14:
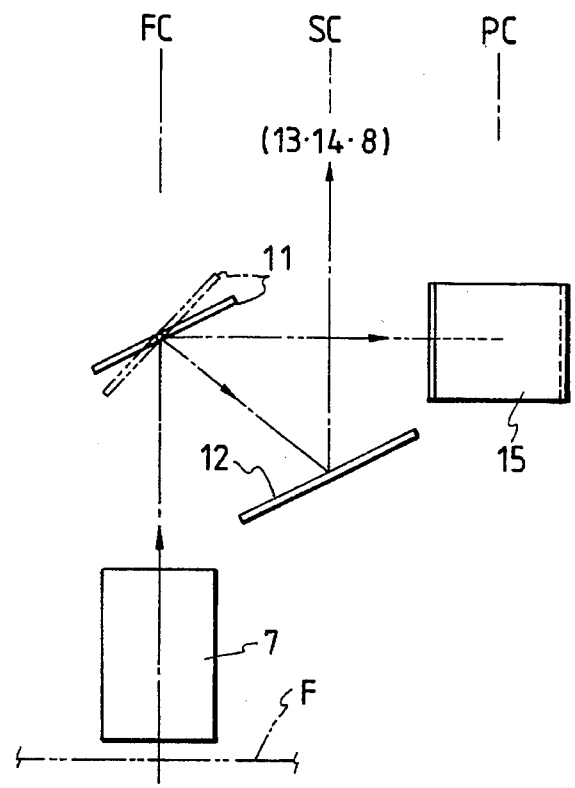
FIG. 14 is a front view illustrating the first, second and fifth mirrors of an apparatus in a fourth embodiment.

In accordance with this embodiment, the first mirror 11 is not the rotary scan mirror but a mirror capable of being switched to two positions, i.e., the first angular posture position indicated by the solid line in FIG. 14 and the second angular posture position.

The second and fifth mirrors 12, 15 are, as in the embodiment 3 discussed above, fixedly disposed beforehand in the first angular posture position defined as the reader position and in the second angular posture position defined as the printer position.

During the reader mode, the first mirror 11 is switched and held in the first angular posture position shown by the solid line in FIG. 14 to have an angle to reflect the light outgoing from the projection lens 7 towards the second mirror 12. Then, the light from the first mirror 11 is reflected upwards by the second mirror 12. The reflected light is projected to form an image on the plane of the screen 8 via the third and fourth mirrors 13, 14.

The fifth mirror 15 is located with a retreat from the reader optical path. Hence, no light is incident on the fifth mirror 15 from the first mirror 11.

During the print mode, the first mirror 11 is switched and held in the angular posture position shown by the two-dotted chain line in FIG. 14 to have an angle adapted to reflect the light outgoing from the projection lens 7 towards the fifth mirror 15.

Figure 15:
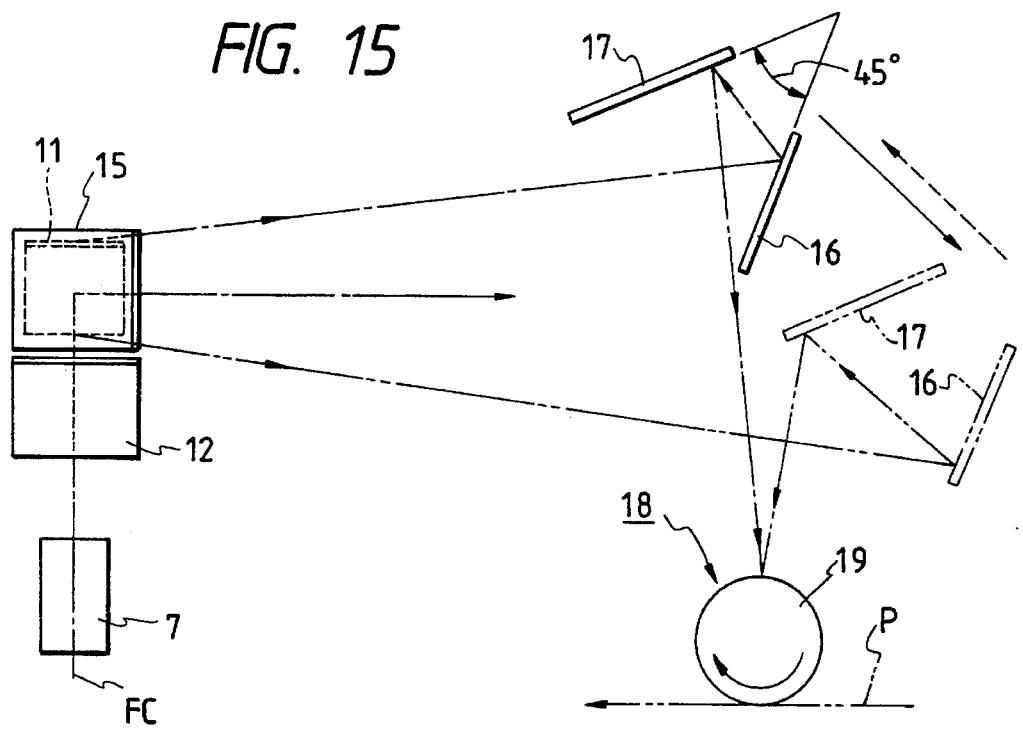
FIG. 15 is a side view of a printer optical system.

In accordance with this embodiment, as illustrated in FIG. 15, the sixth and seventh mirrors 16, 17 make an angle of 45 degrees to each other. The optical scan is conducted by integrally moving these mirrors 16, 17 at a predetermined constant velocity in the arrowed directions in FIG. 15. The slit exposure is effected on the surface of the rotary photosensitive drum 19 of the printer mechanism 18.

In the case of this printer optical system, it is possible to eliminate variations in optical path length at the beginning (or end) and central portions of the optical scan. The printer optical system exhibits an advantage to obtain a print image in which the magnification is kept uniform throughout. A distortion of the rectilinear line in the synchronous direction is thereby obviated.

As discussed above, according to the present invention, the reader-printer comes under such a type that the print sheet from the printer unit is discharged in front of the apparatus. The film carrier and the print discharging section can be located with right and left deviations from each other. Locating thereof is effected so that the printer discharging section is not substantially overshadowed by the film carrier pulled and protruded in front of the apparatus without increasing the width dimension of the apparatus. The reader-printer can be constructed to cause no problem in terms of confirming the conditions of the image on the output print sheet and taking it out.

Further, the apparatus can be miniaturized by reducing the height dimension of the whole apparatus.

Then, the maintenance and inspection in the apparatus are easily performed from the front surface thereof without being hindered by the projection lens and the film carrier.

An embodiment 5 of the present invention will be hereinbelow discussed with reference to FIGS. 16 through 21.

Figure 16:
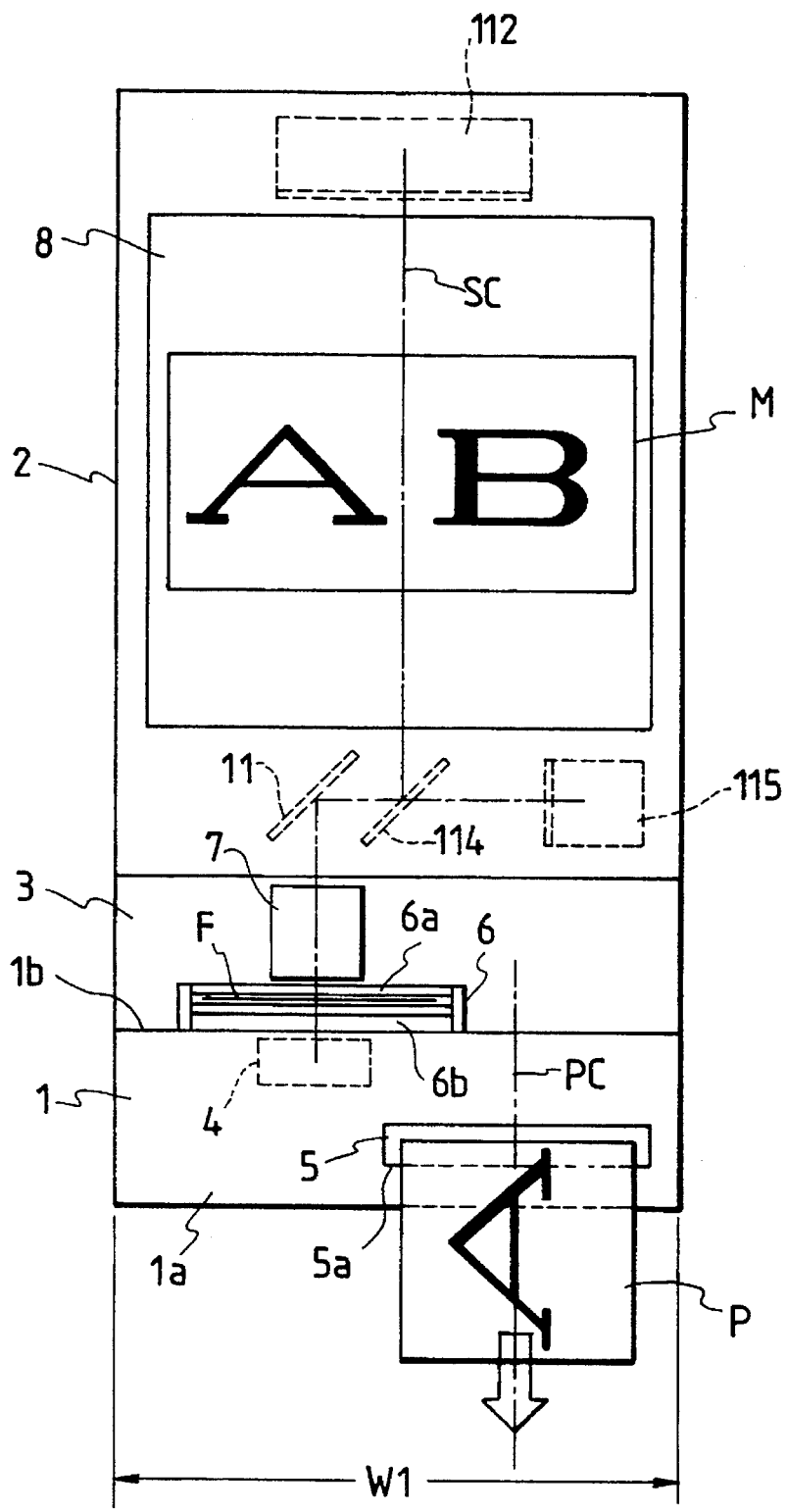
FIG. 16 is a front view showing an apparatus (reader-printer) in a fifth embodiment.
Figure 17:
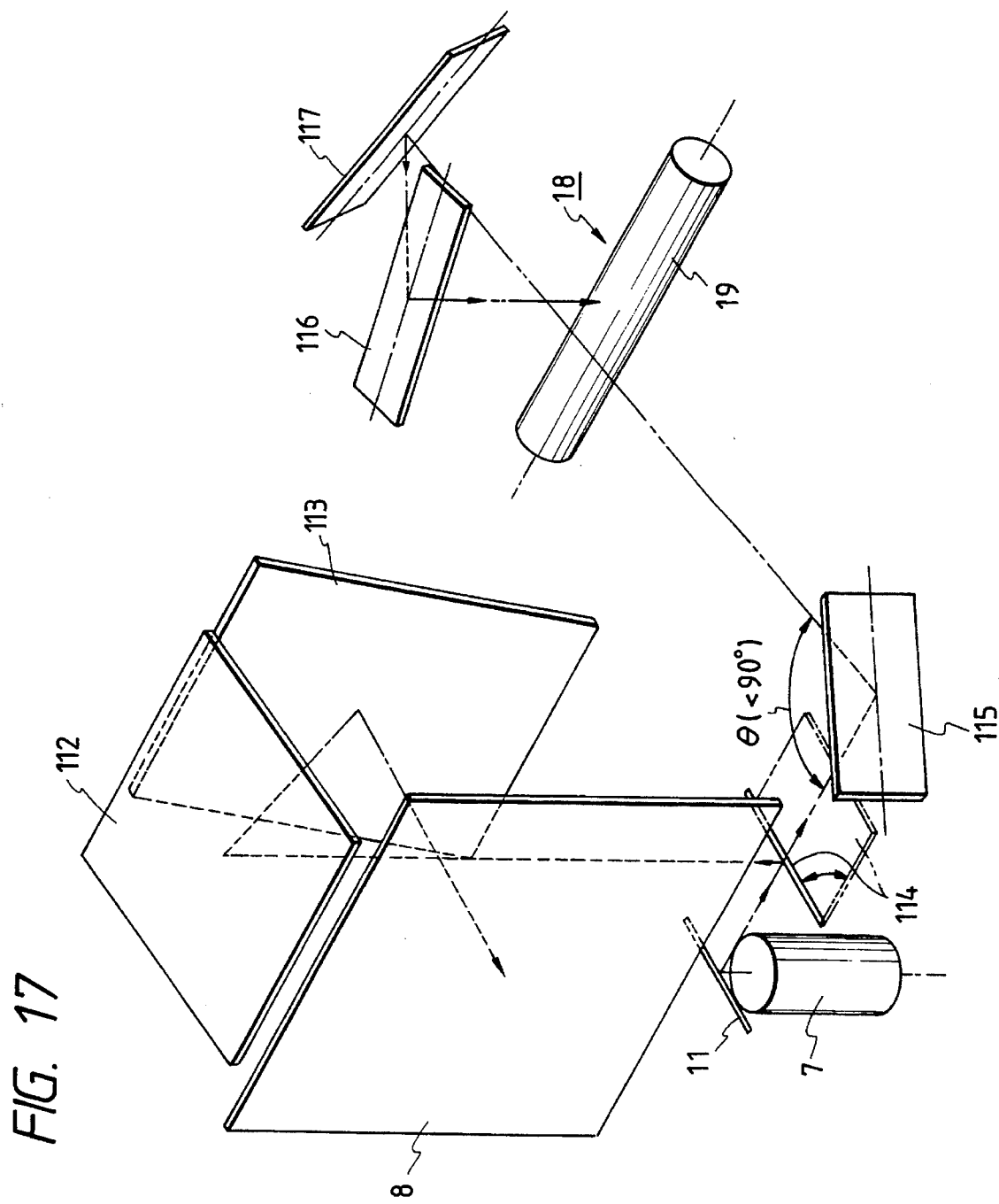
FIG. 17 is a perspective view of the optical system.
Figure 18:
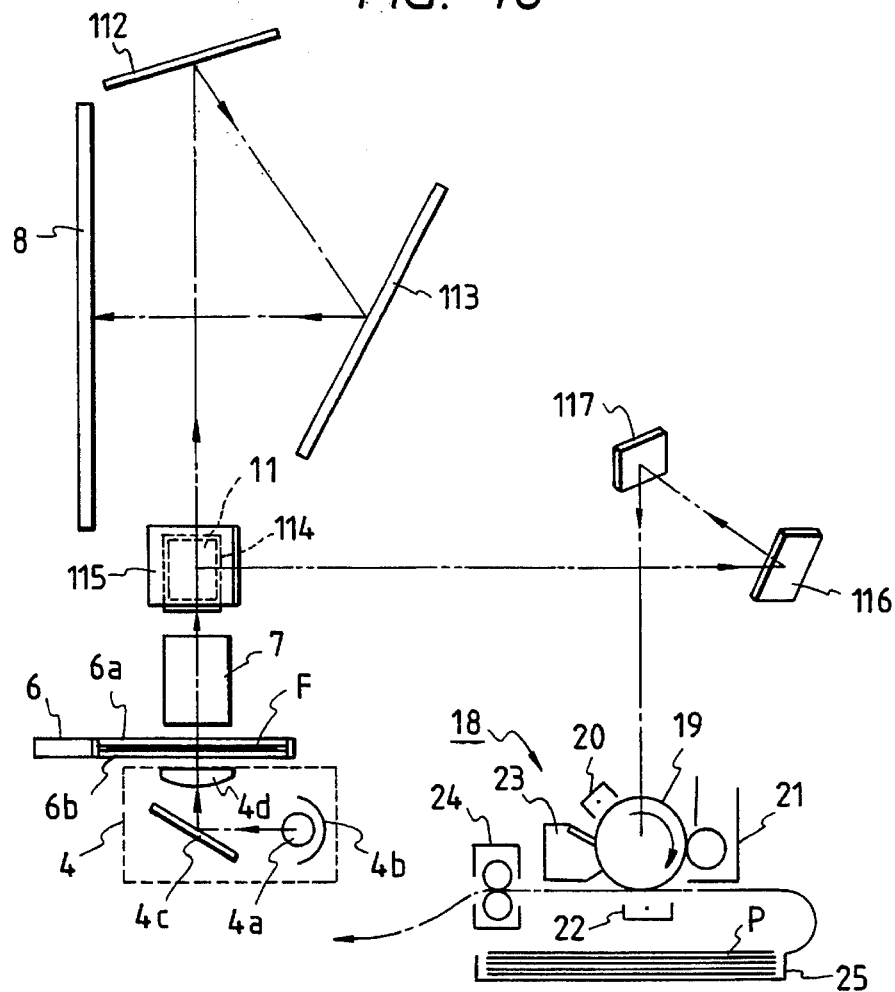
FIG. 18 is a side view of the optical system.
Figure 19:
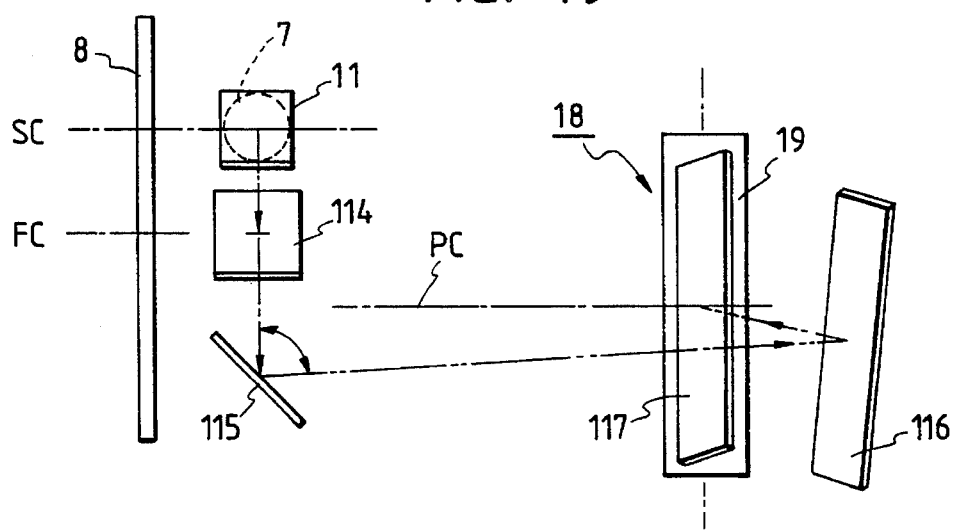
FIG. 19 is a plan view of the print optical system.
Figure 20:
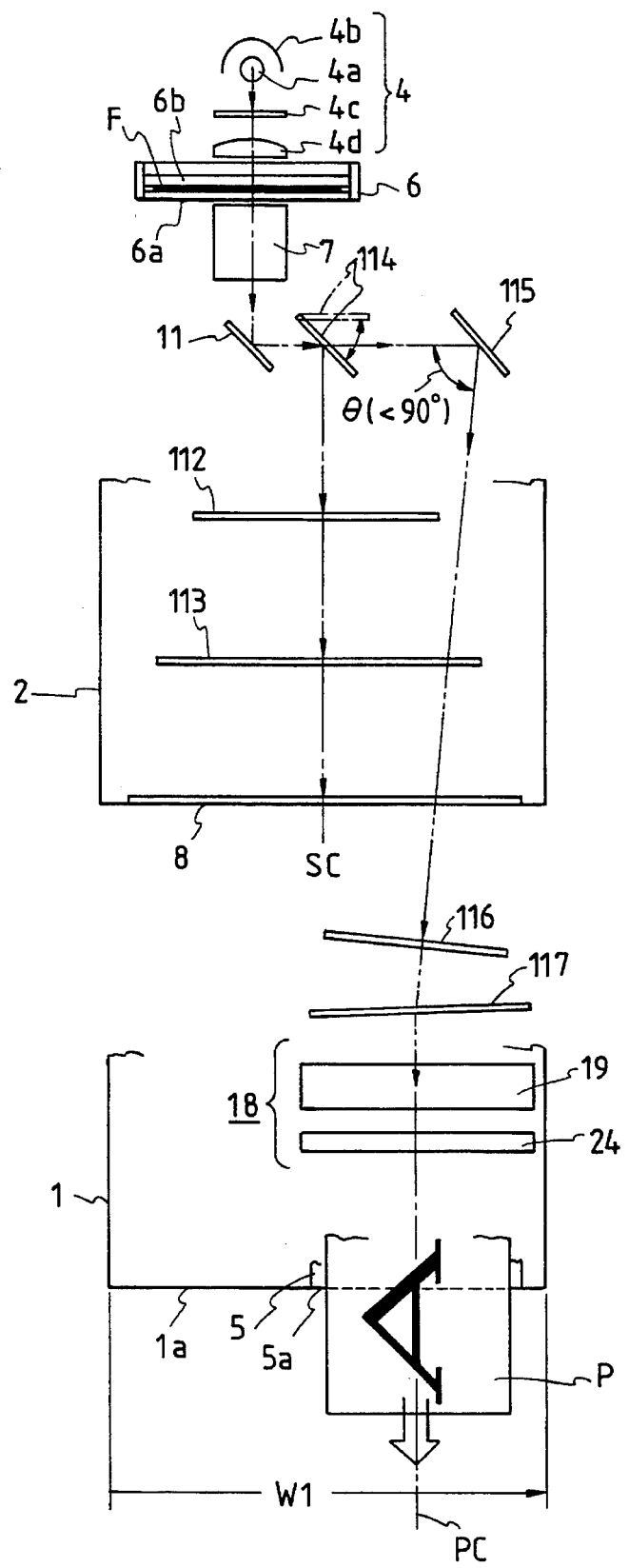
FIG. 20 is a development elevation of the optical system.
Figure 21:
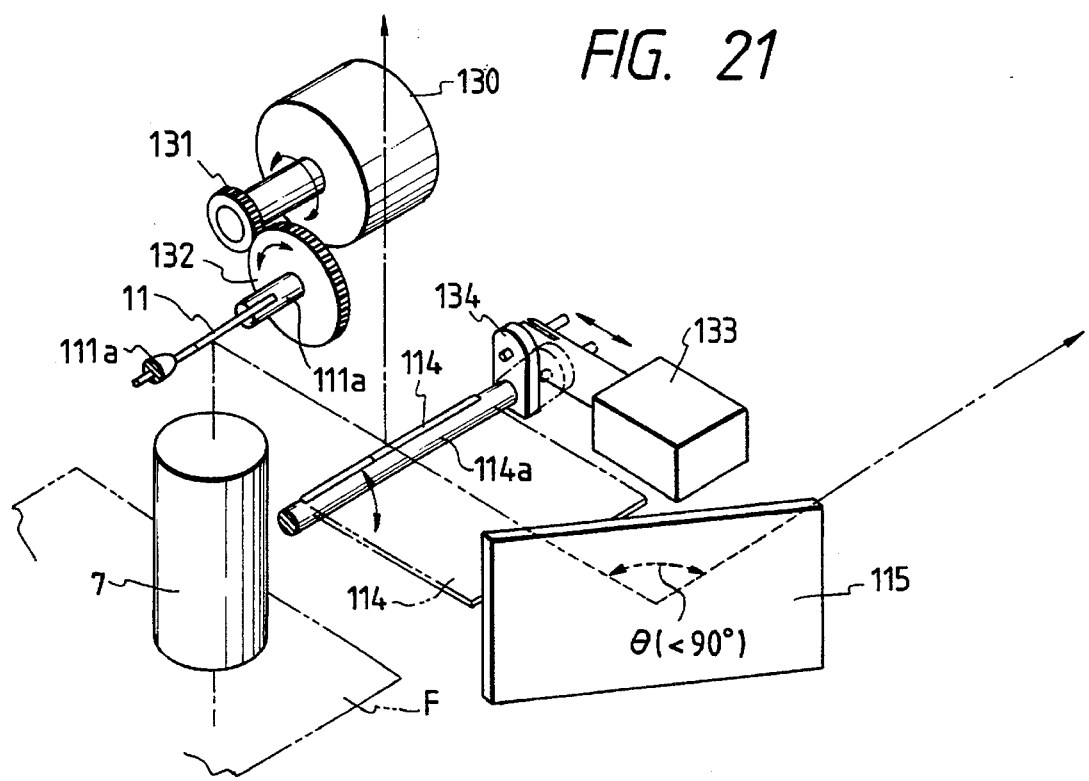
FIG. 21 is a perspective view showing a means for driving the first and second mirrors.

FIG. 16 is a front view of the reader-printer according to the present invention. FIG. 17 is a perspective view of the optical system. FIG. 18 is a side view of the optical system. FIG. 19 is a plan view of the print optical system. FIG. 20 is a development elevation of the optical system. FIG. 21 is a perspective view illustrating means for driving the first and fourth mirrors.

The apparatus in this embodiment is constructed as below. The central line SC of the screen 8 in the crosswise direction is set as a central line of the apparatus in the crosswise direction. The projection lens 7 is disposed with its central line FC rightward of the central line SC as viewed from the front surface of the apparatus. The print discharging section 5 is disposed so that the central line PC in the print discharging/conveying direction deviates to the opposite, i.e., right hand, side of central line SC from central line FC.

A reader optical system will be explained.

In the apparatus in accordance with this embodiment, a film image frame is retrieved and positioned under the projection lens 7 through the film carrier 6. Transmitted light of the film image frame illuminated with the light in the illuminating section 4 enters the upper box unit 2 via the projection lens 7. The transmitted light is turned and reflected in this sequence: the first mirror 11 →the fourth mirror 114→the second mirror 112→the third mirror 113. The reflected light is projected to form an enlarged image on the inner surface of the projection screen 8. The projected image is read on the outer plane of the screen 8.

The first mirror 11 is a rotary scan mirror rotated forwards and reversely about a horizontal shaft 11a (FIG. 21) in the back-and-fourth directions of the apparatus by means of a forward-reverse rotation motor 130 and gears 131, 132. During the reader mode, the first mirror 11 is fixedly held in the first angular posture position (reader position) in which the reflection surface thereof is skewed downwards at 45 degrees. The light emerges upwards from the projection lens 7 and is incident upon the upper box unit 2 from below. This light is turned rightwards of the apparatus by the first mirror 11 set in the first angular posture position.

The fourth mirror 114 is a mirror middled between the first mirror 11 and the fifth mirror 115 disposed rightwards of the first mirror. The fourth mirror 114 is held in the first angular posture position (reader position) and the second angular posture position (retreat position) (indicated by the two-dotted chain line in FIGS. 17 and 21) under ON/OFF control of an electromagnetic solenoid-plunger device 133. In the first angular posture position, the reflection surface thereof is skewed leftwards upwards at 45 degrees on the basis of the horizontal shaft 11a (FIG. 21) in the back-and-forth directions of the apparatus in the first angular posture position. In the second angular posture position, the reflection surface is substantially horizontally. During the reader mode, the fourth mirror 114 is held in the first angular posture position where the reflection surface is skewed leftwards upwards at 45 degrees. The reflected light from the first mirror 11 is turned upwards.

The fourth mirror 114 is located in a relation where the optical axis of an upward-turn optical path by the fourth mirror 114 is substantially coincident with the central line SC of the screen 8 in the crosswise direction.

The light turned upwards by the fourth mirror 114 is reflected sequentially by the second and third mirrors 112, 113. The reflected light is projected to from an image on the plane of the screen 8.

A print optical system will next be described.

When depressing the print key, a driving sequence of the print mechanism 18 of the apparatus is initiated. The fourth mirror 114 is switched to the second angular posture position where the reflection surface thereof is fallen substantially horizontally. The fourth mirror 114 then retreats from the optical path.

Subsequently, the motor 130 for the first mirror 11 is energized with electricity to make a reverse rotation. The first mirror 11 is temporarily rotated clockwise about the horizontal shaft 11a in FIG. 21. After the rotation has proceeded through a predetermined rotary angle, the motor 130 is energized with electricity to make a forward rotation. The first mirror 11 is rotationally driven counterclockwise about the horizontal shaft 111a at a predetermined angular speed. With this rotation of the first mirror 11, the optical scan of the light outgoing from the projection lens 7 is performed. The reflected light from the rotated first mirror 11 is then incident on the fifth mirror 115. The incident light is turned backwards in the back-and-forth directions of the apparatus.

The first mirror 11 is rotated while being considerably decelerated due to a gear ratio of the gear 131 to the gear 132. A scanning speed and direction of the light outgoing from the projection lens 7 through the rotated first mirror 11 coincide with a rotating speed and direction of the photosensitive drum 19 of the print mechanism 18.

The light turned backwards by the fifth mirror 115 is reflected sequentially by the sixth and seventh mirrors 116, 117. The reflected light is projected to form an image on the surface of the rotary photosensitive drum 19 of the print mechanism 18. Namely, an enlarged image of information of the image frame of the film F undergoes a slit exposure on the surface of the rotary photosensitive drum 19. Printing of the exposed image information thereof is executed by the print mechanism 18. The print sheet passing through the image transfer section of the photosensitive drum 19 is discharged to the print discharging section 5 via the fixing device 24.

Herein, the fifth mirror 115 is disposed to take an angular posture having an angle θ smaller than 90 degrees. This angle θ is made by a crosswise optical path along which the light is incident on the fifth mirror 115 from the first mirror 11 and by an optical path along which the light travels towards the print mechanism 18 from the fifth mirror 115. The print mechanism 18 and the print discharging section 5 are placed in the apparatus. This placement is given in a state where the central line PC in the print sheet conveying direction from the print mechanism 18 to the print discharging section 5 is made to approach the central line SC of the screen 8 in the crosswise direction.

In this instance, the optical axis extending from the fifth mirror 115 to the sixth mirror 116 is, as illustrated in FIGS. 19 and 20, not perpendicular to the projection plane of the projection screen 8. On the other hand, the central line PC in the print conveying direction from the print mechanism 18 to the print discharging section 5 is perpendicular to the projection plane of the projection screen 8. Hence, the sixth mirror 116 and the seventh mirror are disposed with a twist as illustrated in FIGS. 18 to 20, thereby providing an optical path for directing the light.

With this twist placement of the mirrors, the fifth to seventh mirrors 115–117 of the print optical system are constructed so that all the axial lines with respect to the respective mirrors do not exist on the same plane when the luminous flux in the axial line direction of the photosensitive body of the print mechanism 18 is reflected by each mirror.

Based on the construction given above, the print unit (print mechanism 18 and print discharging section 5) can be located in the vicinity of the central part in the crosswise direction within the apparatus. The width dimension W1 of the apparatus can be reduced under the width dimension of the conventional apparatus described above. The apparatus can be thereby made compact.

During the print mode, the first mirror 11 conceived as the rotary scan mirror is rotated to the predetermined rotation end point. At this time, the motor 130 is energized with electricity to effect the reverse rotation. The first mirror 11 is thereby rotationally returned. In the case of copying a plurality of sheets, the forward and return rotations of the first mirror 11 are repeatedly executed corresponding to a set number of sheets.

When switched from the print mode again to the reader mode, the first mirror 11 is fixedly held in the first angular posture position (reader position). Further, the fourth mirror 114 is returned to the first angular posture position where the reflection surface is skewed leftwards upwards at 45 degrees from the second angular posture position where the reflection surface is fallen substantially horizontally. With this return, the optical system reverts to the reader mode state.

Figure 23:
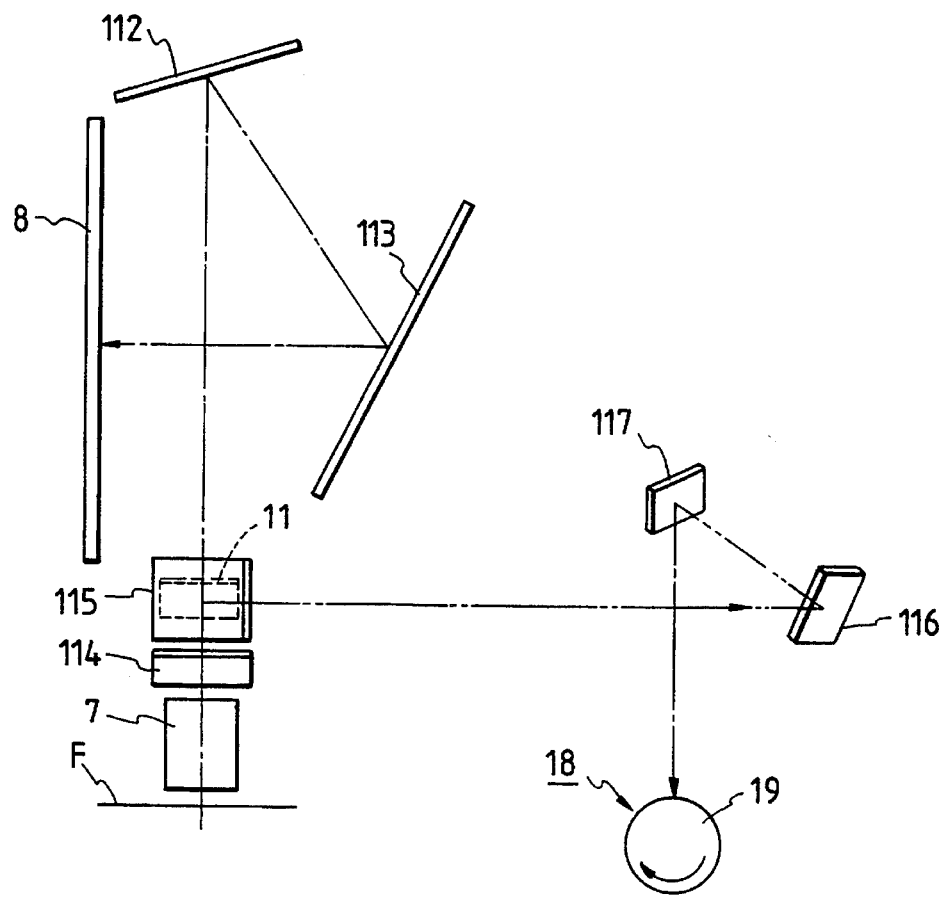
FIG. 23 is a side view of the optical system.
Figure 24:
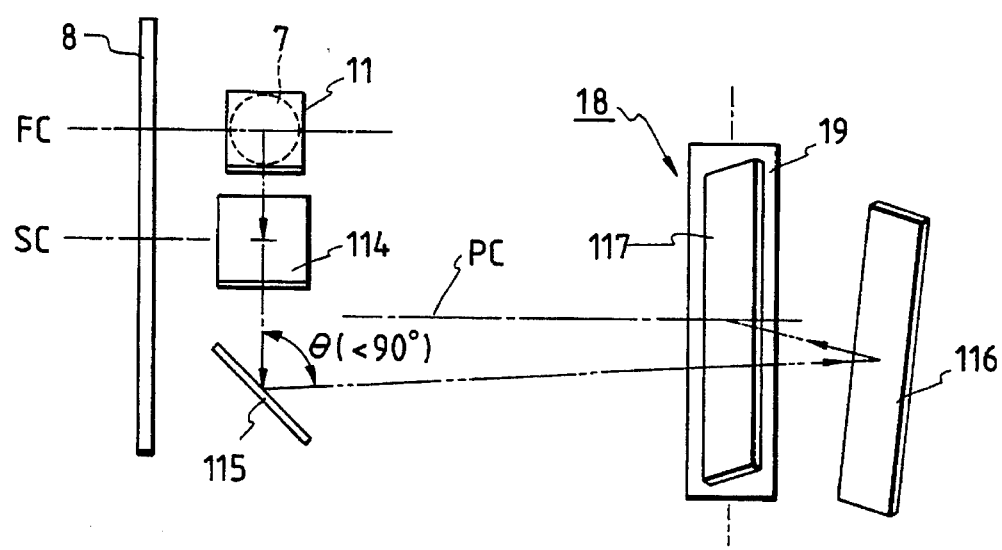
FIG. 24 is a plan view of the optical system.

An embodiment 6 of the present invention will hereafter be described with reference to FIGS. 22 through 24.

This embodiment presents a further constructive example of the reader optical system and the print optical system.

In accordance with this embodiment, the fourth mirror 114 is previously fixedly disposed in the first angular posture position defined as the reader position. The fourth mirror 114 is disposed below the fifth mirror 115. These mirrors are retreated mutually from the reader optical path and the print optical path. The first mirror 11 is, as in the case of the apparatus in the embodiment 5, a rotary scan mirror. A relation of the twist placement of the fifth to seventh mirrors 115–117 is the same with the embodiment 5 discussed above.

Figure 22:
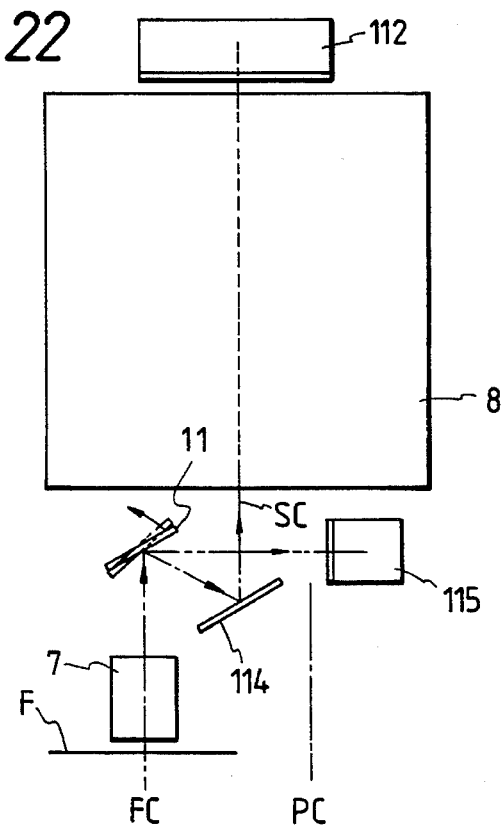
FIG. 22 is a front view of the optical system of an apparatus in a sixth embodiment.

During the reader mode, the first mirror 11 is fixedly held in the first angular posture position indicated by the solid line in FIG. 22 to have an angle to reflect the light outgoing from the projection lens 7 towards the fourth mirror 114. Then, the light reflected upwards by the fourth mirror 114 is projected to form an image on the plane of the screen 8 via the second and third mirrors 112, 113.

The fifth mirror 115 is located out of the reader optical path. Consequently, no light is incident on the fifth mirror 115 from the first mirror 11 in the first angular posture position.

During the print mode, the first mirror 11 is rotationally switched to the second angular posture position shown by the two-dotted chain line in FIG. 22 to have an angle to reflect the light outgoing from the projection lens 7 towards the fifth mirror 115. Next, as in the preceding embodiment 5, the first mirror 11 is rotated for scanning at a predetermined angular speed. The scanning light thereof enters the printer mechanism 18 via the fifth, sixth and seventh mirrors 115, 116, 117. The light is projected to form an enlarged image on the rotary photosensitive drum 19. Printing is then executed.

In this case, the first mirror 11 is switched to the second angular posture position of the fifth mirror 115. Since the first mirror 11 is further rotated for scanning, the scanning light of the rotated first mirror 11 gradually diverts from the fourth mirror 114.

The apparatus in this embodiment has no necessity for driving the fourth mirror 114 to switch its posture as shown in the embodiment in the case of mutually switching the reader and printer modes. Hence, the driving means is unnecessary, resulting in a reduction in the costs.

Figure 25:
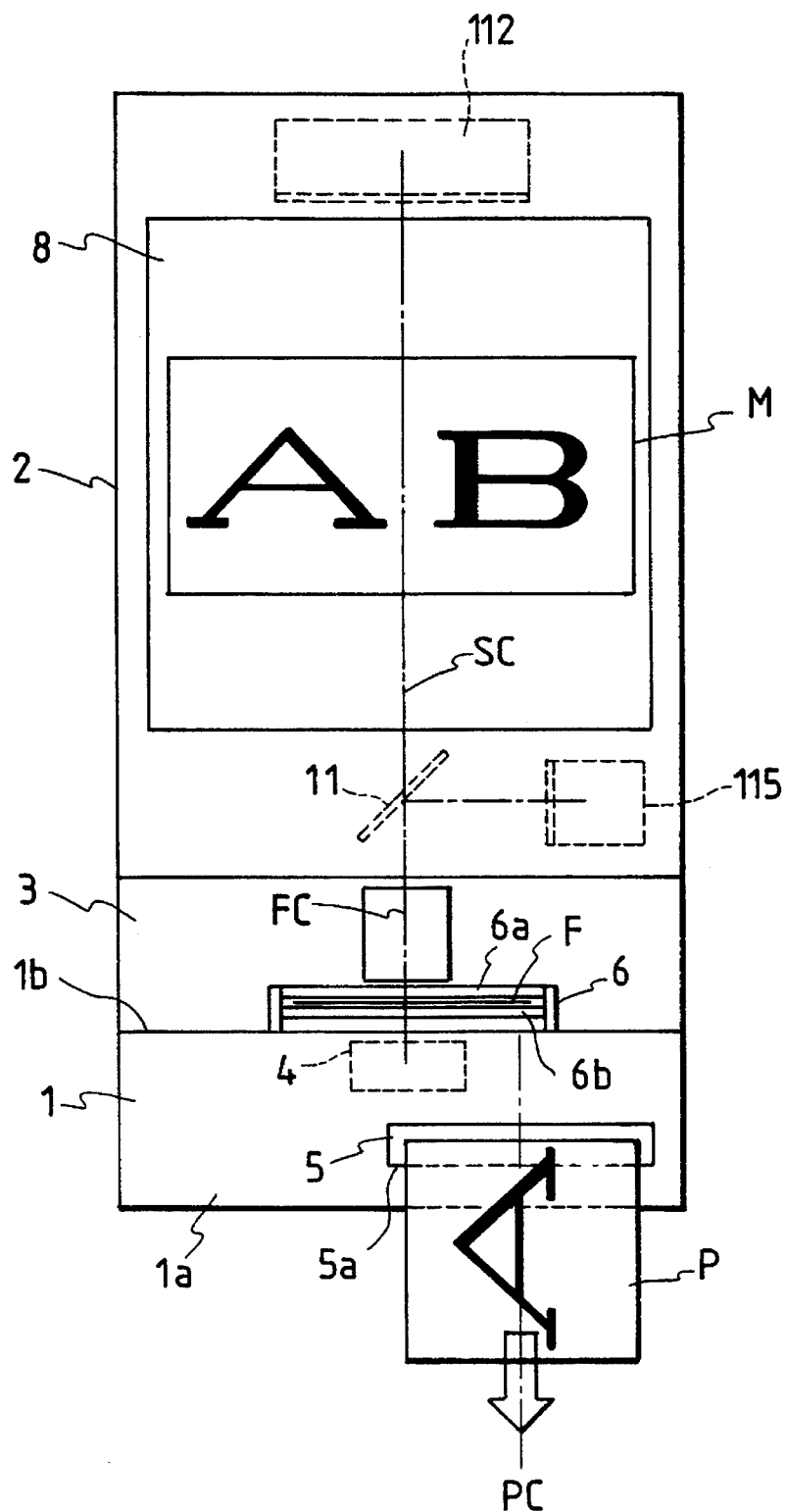
FIG. 25 is a front view illustrating an apparatus in a seventh embodiment.

An embodiment 7 of the present invention will be described hereinbelow with reference to FIGS. 25 through 27.

This embodiment presents a still further constructive example of the reader and printer optical systems.

The apparatus in this embodiment is constructed as follows. The central line SC of the screen 8 in the crosswise direction is set as a central line of the apparatus in the crosswise direction. The projection lens 7 is disposed so that the central line FC of the projection lens 7 coincides with the central line SC of the screen. The print mechanism 9 and the print discharging section 5 are so placed that the central line PC in the print sheet conveying direction is made close to the vicinity of the center of the apparatus.

Figure 26:
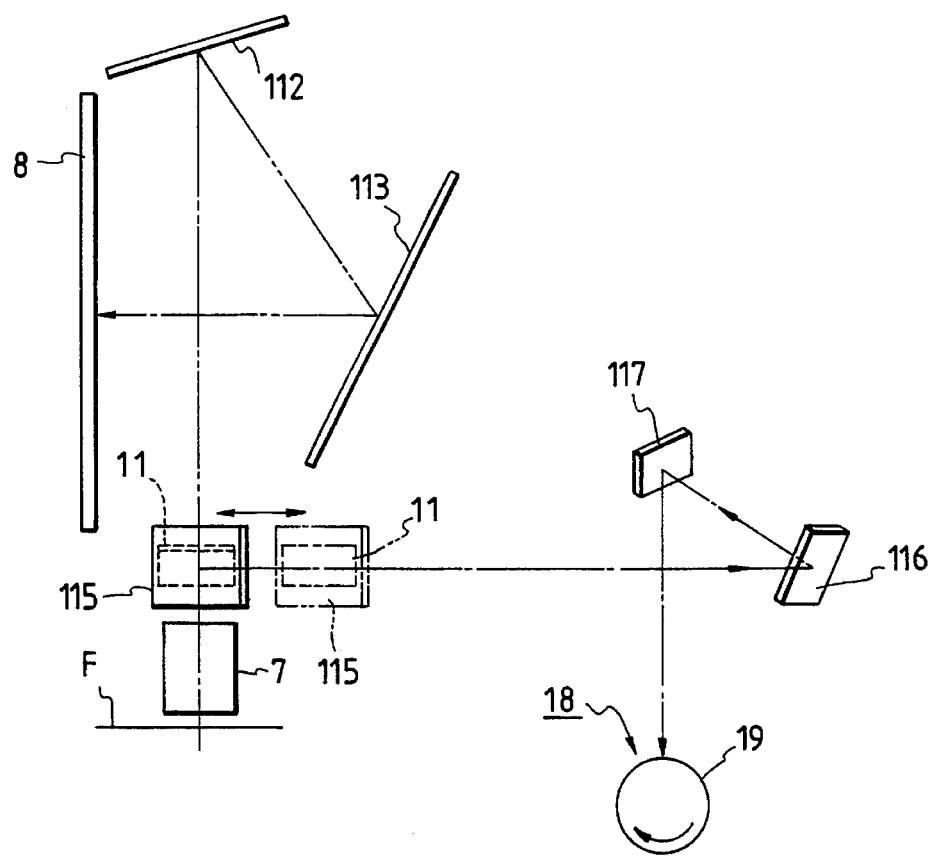
FIG. 26 is a side view of the optical system.
Figure 27:
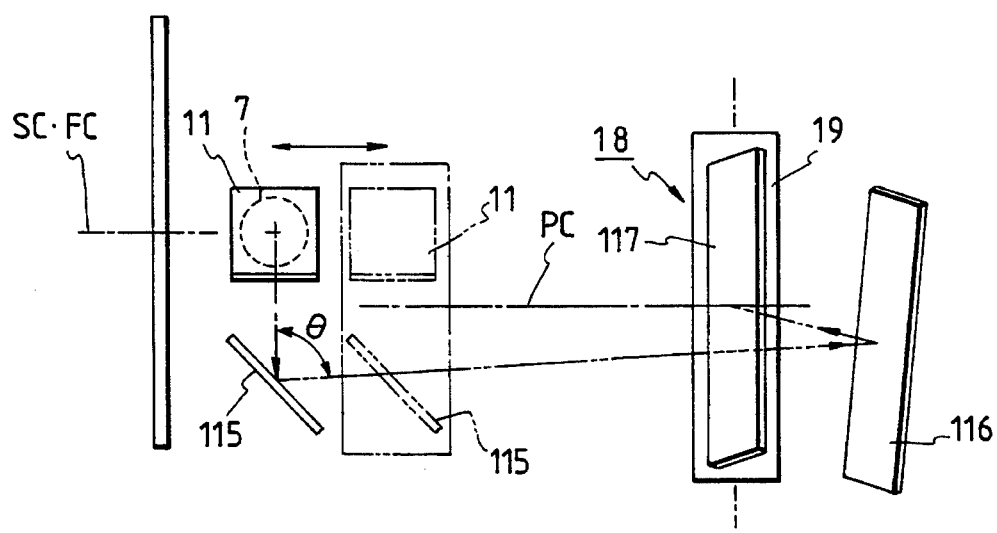
FIG. 27 is a plan view of the optical system.

During the print mode, a support carrier for the first mirror 11 and the fifth mirror 115 is moved forwards and held in an optical path intervening position indicated by the solid line in FIGS. 26 and 27. The first mirror 11 is held in the optical path on the exit side of the projection lens 7.

Then, the first mirror 11 is rotationally driven at a predetermined angular speed as in the embodiments 5 and 6. With this rotation of the first mirror 11, the light outgoing from the projection lens 7 is used for an optical scan. The reflected light from the first mirror 11 is then incident on the fifth mirror 115 and turned backwards in the back-and-forth directions of the apparatus. As in the embodiments 5 and 6, the light enters the print mechanism 18 via the sixth and seventh mirrors 116, 117. The light is projected to form an enlarged image on the rotary photosensitive drum 19, with the result that printing is executed.

In accordance with the embodiments 5 and 6 discussed above, four mirrors 11, 114, 112, 113 including the first mirror common to the print system are provided as those of the reader system. Contrastingly in the apparatus in accordance with this embodiment, two mirrors 112, 113 are provided. The costs are therefore decreased, and at the same time there exists less possibility for the optical axis deviates. Further, it is possible to prevent a decline in screen illuminance due to a loss in light quantity by reflection.

Note that the first and fifth mirrors 11, 115 are moved together back and forth in the print and reader modes. However, the fifth mirror 115 is fixed, whereas only the first mirror 11 may be moved to and from.

As discussed above, in the reader-printer according to the present invention, the print unit (print mechanism and print discharging section) can be located in the vicinity of the central part in the widthwise direction within the apparatus. The apparatus can be made compact without the print unit protruding in the crosswise direction of the reader unit enough to require an increase in the width of the apparatus.

Although the illustrative embodiments of the present invention have been described in detal with reference to the accompanying drawings, it is to be understood that the present invention is not limited to those embodiments. Various changes or modification may be effected by one skilled in the art without departing from the scope or spirit of the invention.

What is claimed is:

1. A film reader-printer unit, comprising:

a screen for displaying an image on a film, said screen located in a front portion of the reader-printer unit;

a projection lens disposed below said screen;

a first optical system for projecting an imaging light of film emitted through said projection lens to said screen to be displayed;

printing means for recording an image of the film on a recording medium, said printing means having a discharge portion for discharging the recording medium from the front portion of the reader-printer unit, said discharge portion being disposed below said projection lens;

a second optical system for projecting an imaging light of the film emitted through said projection lens to said printing means; and a film carrier for holding the film in a plane, said film carrier being disposed between said projection lens and said discharge portion and being movable in a back and forth direction and right and left direction along a horizontal plane to dispose a desired image on the film into an optical path of said projection lens, wherein when viewed from the front portion of the reader-printer unit, a center of said discharge portion is located at one side of a vertically extending centerline of said screen, an optical axis of said projection lens is located at the other side of the centerline of said screen, and the center of said discharge portion and the optical axis of said projection lens are located between right and left sides of said screen.

2. The reader-printer unit according to claim 1, wherein said first optical system includes a first mirror for directing light from said projection lens in a lateral direction, a second mirror for directing the light reflected by said first mirror towards said screen, and said second optical system includes a third mirror for directing the light reflected by said first mirror towards said printing means.

3. The reader-printer unit according to claim 2, further comprising mirror rotating means for rotating said first mirror.

4. The reader-printer unit according to claim 3, wherein said printing means includes a photosensitive body, and said first mirror is rotated by said rotating means to direct an image of the film to be exposure-scanned on said photosensitive body.

5. The reader-printer unit according to claim 2, wherein an angle made by an incident optical axis and an exit optical axis of said third mirror is smaller than 90 degrees.

6. A reader-printer unit according to claim 2, wherein said second mirror is disposed between said first mirror and said third mirror as viewed from the front portion of the reader-printer unit.

7. The reader-printer unit according to claim 1, wherein the film is a microfiche.

8. The reader-printer unit according to claim 1, wherein said discharge portion comprises a tray for accommodating the recording medium discharged from said printing means, said tray disposed below said film carrier.

9. The reader-printer unit according to claim 8, wherein said printing means includes a rotary photosensitive drum, transfer means for transferring the image formed on said photosensitive drum onto the recording medium and conveying means for discharging the recording medium onto which the image is transferred into said tray disposed in front of said apparatus.

10. The reader-printer unit according to claim 9, further comprising a lamp for illuminating the film, said tray being disposed substantially next to said lamp.

11. The reader-printer unit according to claim 9, further comprising a door for opening and closing a conveying passageway for the recording medium, said door being disposed substantially next to said projections lens and openable/closable from the front portion of the reader-printer unit.

12. The reader-printer unit according to claim 1, wherein said first optical system has a plurality of mirrors, and when viewed from the front portion of the reader-printer unit, an optical axis of at least a first mirror of said first optical system is located at one side of the centerline of said screen, and said second optical system has an optical axis located at the other side of the centerline of said screen.

13. The reader-printer unit according to claim 12, wherein:

optical axes of said plurality of mirrors of said first optical system other than said first mirror are located substantially on the centerline of said screen.

14. A microfilm projecting device for projecting an image of a microfilm, comprising:

a screen for displaying the image;

printing means, including a photosensitive body, for recording the image on a recording medium;

a projection lens located below said screen;

illuminating means for illuminating the film and emitting light through said projection lens;

a first mirror disposed in an optical path exiting from said projection lens;

a first optical system for directing the light reflected by said first mirror towards said screen;

a second optical system for directing the light reflected by said first mirror towards said photosensitive body, said second optical system including at least a second mirror opposed to said photosensitive body;

conveying means for discharging a recording medium on which an image formed on the photosensitive body has been transferred, said conveying means including a tray disposed below said projection lens and in a front portion of the device for receiving the conveyed recording medium; and a film carrier for holding the film in a plane, said film carrier being disposed between said projection lens and said discharge portion and being movable in a back and forth direction and right and left direction along a horizontal plane to dispose a desired image on the film into an optical path of said projection lens, wherein when viewed from the front portion of the device, a first optical path formed between said projection lens and said first mirror is located at one side of a vertically extending centerline of said screen, a second optical path formed between said second mirror and said photosensitive body is formed at the other side of the centerline of said screen, and the first and second optical paths are located between right and left sides of said screen.

15. The microfilm projecting device according to claim 14, further comprising mirror rotating means for rotating said first mirror, wherein light exiting from said projection lens is reflected in a direction substantially parallel with a plane of said screen.

16. The microfilm projecting device according to claim 14, wherein an optical axis of said projection lens is located at one side of the centerline of said screen and a centerline of said tray is located at the other side thereof.

17. The microfilm projecting device according to claim 14, wherein said first optical system is disposed such that an optical axis of said first optical system may be coincident with the centerline of said screen.

18. A film projecting device having a viewing mode for observing an image on a film and a printing mode for printing the image on a recording medium, comprising:

a screen for displaying the image in the viewing mode;

printing means for printing the image on the recording medium in the printing mode;

an apparatus body for housing said screen and said printing means;

a film carrier provided below said screen and disposed in a front portion of said apparatus body, said film carrier being movable in a back and forth direction and in a right and left direction along a horizontal plane while holding the film;

a projection lens disposed between said carrier and said screen, an optical axis of said projection lens located a distance from a centerline of said screen when viewed from said front portion of said apparatus body;

illuminating means for illuminating the film and emitting light through said projection lens; and discharge means for discharging the printed recording medium, said discharge means including a discharge port opening in said front portion of said apparatus body and below said film carrier, with a center of the discharge port located a distance from the centerline of said screen, wherein the center of the discharge port is located between right and left sides of said screen.

* * * * *

UNITED STATES PATENT AND TRADEMARK OFFICE
CERTIFICATE OF CORRECTION

PATENT NO. : 5,497,216
DATED : March 5, 1996
INVENTOR(S) : Onuki et al.

It is certified that error appears in the above-indentified patent and that said Letters Patent is hereby corrected as shown below:

COLUMN 11:

Line 32, "11a" should read --111a--.
  Line 51, "11a" should read --111a--.
  Line 66, "from" should read --form--.

COLUMN 12:

Line 11, "11a" should read --111a--.

COLUMN 14:

Line 41, "deviates." should read --to deviate--.
  Line 56, "detal" should read --detail--.

COLUMN 16:

Line 1, "projections" should read --projection--.

Signed and Sealed this

Eighth Day of October, 1996

Attest:

BRUCE LEHMAN

Attesting Officer      *Commissioner of Patents and Trademarks*